(12) United States Patent
Martin

(10) Patent No.: US 6,256,779 B1
(45) Date of Patent: Jul. 3, 2001

(54) DISTRIBUTED PROCESSING

(75) Inventor: Paul A Martin, Great Bealing (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/091,741

(22) PCT Filed: Sep. 25, 1997

(86) PCT No.: PCT/GB97/02606

§ 371 Date: Jun. 24, 1998

§ 102(e) Date: Jun. 24, 1998

(87) PCT Pub. No.: WO98/13758

PCT Pub. Date: Apr. 2, 1998

(30) Foreign Application Priority Data

Sep. 27, 1996 (GB) .................................................. 9620196

(51) Int. Cl.[7] ..................................................... G06F 9/45
(52) U.S. Cl. .............................. 717/5; 717/6; 709/202; 709/203
(58) Field of Search ............................... 395/705; 717/5, 717/6; 709/202, 203, 328

(56) References Cited

U.S. PATENT DOCUMENTS

| 5,463,625 | * | 10/1995 | Yasrebi ................................. 370/401 |
| 5,497,463 | * | 3/1996 | Stein et al. ........................... 709/203 |
| 5,596,579 | * | 1/1997 | Yasrebi ................................. 709/328 |
| 5,684,955 | * | 11/1997 | Meyer et al. ......................... 709/303 |
| 5,689,664 | * | 11/1997 | Narayanan et al. ................. 345/340 |
| 5,724,588 | * | 3/1998 | Hill et al. ............................. 709/328 |
| 5,764,977 | * | 6/1998 | Oulid-Aissa et al. ................. 707/10 |
| 5,764,982 | * | 6/1998 | Madduri ............................... 709/300 |
| 5,790,789 | * | 8/1998 | Suarez .................................. 709/202 |
| 5,793,965 | * | 8/1998 | Vanderbilt et al. .................. 709/203 |
| 5,794,030 | * | 8/1998 | Morsi et al. ......................... 707/103 |
| 5,835,757 | * | 11/1998 | Oulid-Aissa et al. ................. 707/10 |
| 5,937,192 | * | 8/1999 | Martin ................................. 395/705 |
| 5,960,200 | * | 9/1999 | Eager et al. ............................ 717/5 |
| 5,983,004 | * | 11/1999 | Shaw et al. ...................... 395/200.57 |
| 5,999,987 | * | 12/1999 | O'Farrell et al. .................... 709/304 |
| 6,014,686 | * | 1/2000 | Elnozahy et al. .................... 709/202 |

OTHER PUBLICATIONS

Title: Development tools are just starting to emerge: embedded designers see C++ making the grade C++ seen as living up to expectations, source: electronic engineering times, Jan. 7, 1991.*

Alexander B. Schill et al, "DC++: distributed object–oriented system support on top of OSF DCE", Distributed Systems Engineering, vol. 1, No. 2, Dec. 1993, UK, pp. 112–125.

(List continued on next page.)

Primary Examiner—Kakali Chaki
Assistant Examiner—Chameli C. Das
(74) Attorney, Agent, or Firm—Nixon & Vanderhye P.C.

(57) ABSTRACT

An object present on a first computer is replicated on a second computer. The object includes pointers to program code within the memory space of the first computer. Data elements of said object are stored in a message which is transmitted from the first computer to the second computer. The message is received at the second computer, creating a dummy object which is named and dimensioned to correspond to the object, but which does not include the data values on the second computer. The data values are then read from the received message into the dummy object on the second computer.

10 Claims, 19 Drawing Sheets

OTHER PUBLICATIONS

Chang–Hyun Jo et al, "Parallelizing Translator for an Object–Oriented Parallel Programming Language" Proceedings of the Annual International Phoenix Conference on Computers and Communications, Scottsdale, Arizona, US, Mar. 27–30, 1991, Institute of Electrical and Electronics Engineers, pp. 265–271.

H. Sivaraman et al, "Parallelizing Sequential Programs to a Cluster of Workstations", Proceedings of the 1995 ICPP Workshop on Challenges for Parallel Processing, Raleigh, NC, USA, Aug. 14, 1995, Boca Raton, FL, USA, CRC Press, USA, pp. 38–41.

Eric Jul et al, "Fine–Grained Mobility in the Emerald System", ACM Transactions on Computer Systems, vol. 6, No. 1, Feb. 1988, pp. 109–133.

* cited by examiner

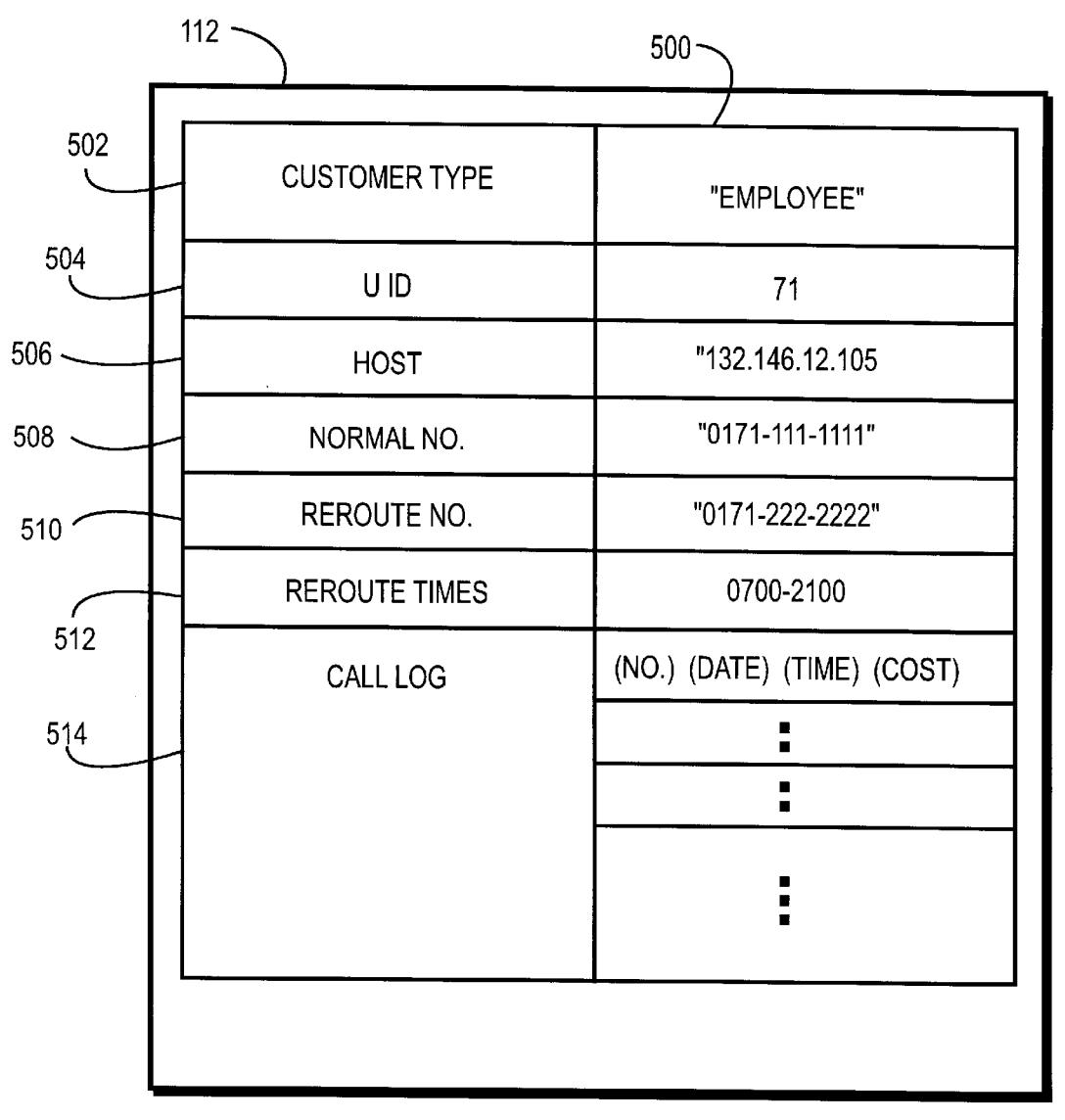

| | |
|---|---|
| CUSTOMER TYPE | "EMPLOYEE" |
| U ID | 71 |
| HOST | "132.146.12.105" |
| NORMAL NO. | "0171-111-1111" |
| REROUTE NO. | "0171-222-2222" |
| REROUTE TIMES | 0700-2100 |
| CALL LOG | (NO.) (DATE) (TIME) (COST) |
| | ⋮ |
| | ⋮ |
| | ⋮ |

Fig.8

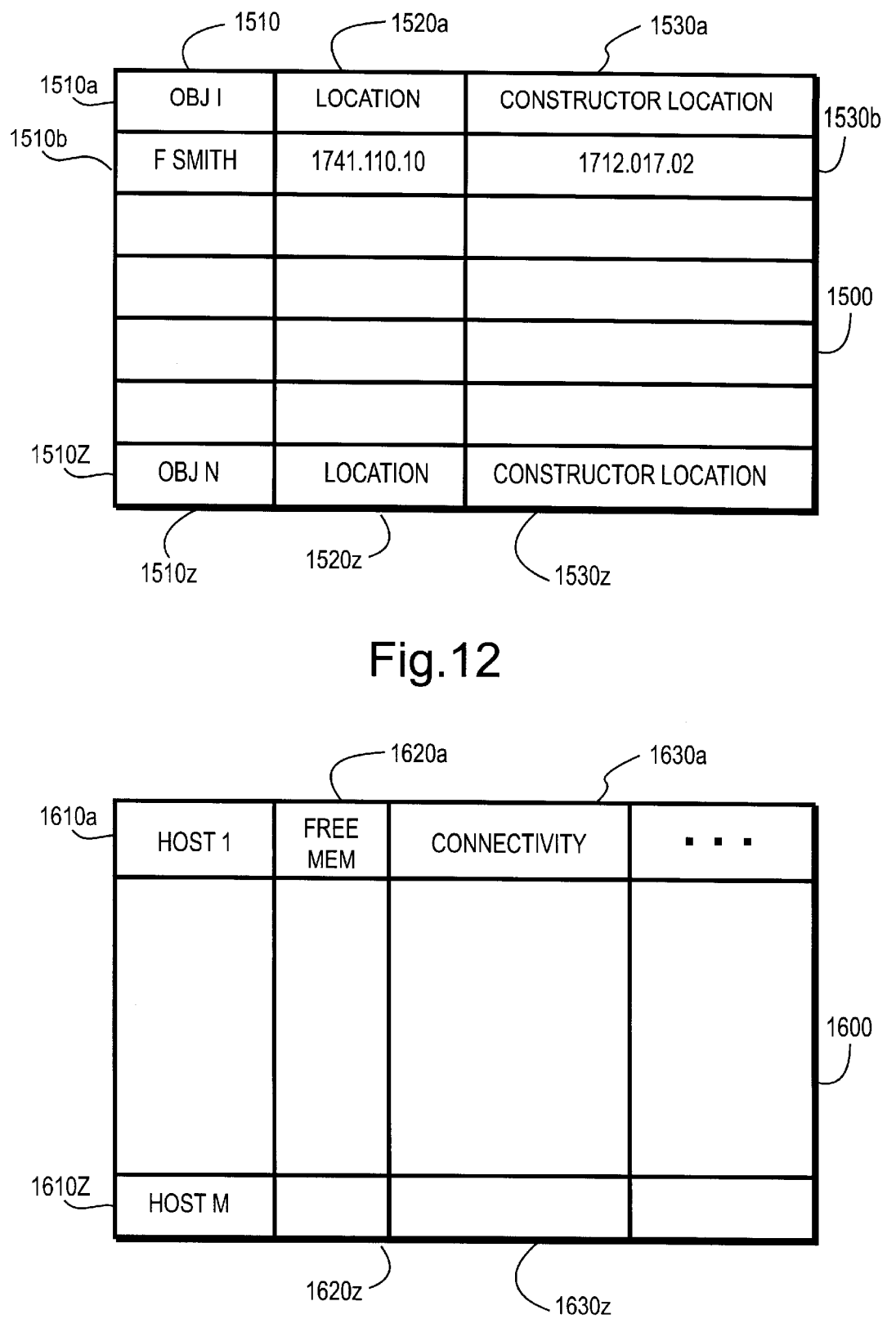

| OBJ I | LOCATION | CONSTRUCTOR LOCATION |
|---|---|---|
| F SMITH | 1741.110.10 | 1712.017.02 |
|  |  |  |
|  |  |  |
|  |  |  |
|  |  |  |
| OBJ N | LOCATION | CONSTRUCTOR LOCATION |

Fig.12

| HOST 1 | FREE MEM | CONNECTIVITY | . . . |
|---|---|---|---|
|  |  |  |  |
| HOST M |  |  |  |

Fig.13

DISTRIBUTED PROCESSING

BACKGROUND OF THE INVENTION

1. Field of the Invention

This invention relates to distributed processing, particularly but not exclusively distributed processing for control of a telecommunications network, and with developing and updating the control systems implemented on the distributed processors, which are preferably (but not necessarily) processes implemented in an object-oriented fashion.

2. Related Art

Telecommunications networks are increasingly required to support high bandwidth, low delay information flow. The bandwidth required is rapidly progressing from kilobits per second to megabits per second and even, for some applications, gigabits per second (particularly, for example, for video on demand; animated shared simulations, and distributed computing).

To provide "intelligent network" facilities such as call redirection to particular numbers, computer programs run on a number of host computers (up to 100, for example) connected with switching centres. The way in which services are to be provided for particular customers (for example, a particular number to which calls for a customer are to be routed) depends upon data stored in relation to that customer on the host computers. Thus, there may be many millions of subscriber records on tens or hundreds of host computers.

In "Twenty-twenty vision—software architectures for intelligence in the 21st century", P. A. Martin, BT Technol J Vol 13 No. 2 April 1995, the present inventor has proposed the use of object-oriented techniques to implement the distributed processing required.

A description of object oriented technology will be found in, for example, *BT Technol J Vol.* 11 No. 3 (July 1993), "Object oriented technology", edited by E. L. Cusack and E. S. Cordingley. Although the term is not always used with precision, object oriented computing here refers to the computing technique in which data is stored in "encapsulated" form in which, rather than being directly accessible by a calling program or routine, the data is accessible only by a limited part of a program which can read, write and edit the data. A record of data and its associated computer code are referred to as an "object". Communication to and from an object is generally by "message passing"; that is, a call to the object passes data values and invokes the operation of one of the programs comprised within the object, which then returns data values.

Various languages are available for programmers who wish to use the objected oriented approach. Of these, the commonest at present is C++.

Distributed processing differs from single processor operation in several respects. Firstly, different access techniques may be required depending on whether other programs or data are located on the same host computer as a calling program or on a different host computer. The location of a program or data will also affect the speed with which it can be reached from another program. Also, one or more host computers may fail whilst leaving others in operation.

Distributed computing is conventionally performed, by using a "client-server" arrangement in which a "client" program on one computer interrogates a "server" program on another computer which then performs the function or returns the data required by the client program.

Object oriented techniques have not widely been applied to distributed processing. A summary of the state of the art in this respect may be found in "Object oriented programming systems"; Blair G., Pitman Publishing, London, 1991 (ISBN 0-273-03132-5) and particularly in Chapter 9 at pages 223–243; "Distributed systems and objects"; David Hutchison and Jonathan Walpole. Previous attempts have generally added new syntax to an existing computer language, or have created new computer languages, to extend conventional object oriented programming to deal with distributed processing.

SUMMARY OF THE INVENTION

In one aspect, the present invention provides a compiler (or pre-compiler) for generating code for use in distributed processing on a plurality of host computers (for example for controlling telecommunications systems) which is arranged to receive a source program written in a computing language, and to amend the source program to adapt it from single processor execution to multiple processor execution.

Conveniently, this aspect of the invention comprises a pre-compiler which can then be used with a more conventional compiler, it but will be recognised that the functionality of the invention could be incorporated directly into a re-written compiler.

Thus, in this aspect, the invention conceals from the programmer the complexities of adapting the program to operate on many different processors, reducing the time required to produce an executable program.

Conveniently, the executable program produced by the invention is a single executable program which may be distributed to all processors of the distributed computing system in identical copies. This makes it easy to add new host processors to the distributed computing system.

In the present embodiments, the source program is in an object oriented language, and is preferably in C++. C++ provides additional problems in compilation for distributed environments, since it is intended for single processor compilation and different processes communicate via shared memory pointers, which cannot operate in a multi processor environment One particular problem which arises is in the use of so-called "virtual functions". A virtual function is usually used to support the possibility of "inheritance", which is often used in object oriented programming, as a way of indicating that one class of objects is a type of example of a more general class.

Virtual functions are provided in C++ by declaring a virtual function name in a (superior) class, but providing the code to execute the function in one or more inferior classes; in other words, subordinate classes which inherit the properties of the superior class.

This enables the name of a single function to be defined for all classes which are hierarchically below (and therefore inherit the behaviour of) the superior class, whilst enabling each such class to behave differently in performing the function.

Each C++ object, in a conventional, single processor C++ system, occupies a certain amount of computer memory within which the data comprised within that the object are stored. Additionally, if the object is of a class which uses virtual functions, the memory within which the object is stored will also store a pointer to a table of pointers (the "virtual pointer table" or VPTR) which, as the name implies, stores one or more pointers to the memory locations of corresponding one or more blocks of program code which implement the virtual function for the object.

Since C++ is intended as a single processor language, rather than a distributed processing language, this arrangement is usually satisfactory. However, we have realised that it is unsuitable for use in a distributed object oriented environment if it is desired to move objects between different host computers (or, more generally, different processes).

A particular aim of the present invention is therefore to provide a distributed object oriented computing system in which objects using virtual pointers may be moved or copied within the system.

In an embodiment, this is achieved by providing, on each host computer within the distributed computing system, means for reading an object; separating the data elements thereof from the virtual pointers thereof; and transmitting the data elements thereof to a further computer.

In this embodiment, each computer preferably additionally or alternatively comprises means for receiving data elements of an object from a further host computer; means for creating a new object of the same type but with dummy data locally; and means for inserting the received data values, but not virtual pointer values, into the object thus created to replace the dummy data therein.

Conveniently, in this embodiment, a compiler or precompiler is provided which accepts conventional C++ (or other object oriented) source code, and, on detection of virtual functions, adds additional code to make objects of classes having the virtual functions movable to and/or from the target processor for which the code is compiled. Preferably, the additional code comprises, for each class, a special object constructor function which can create a new object with dummy data values but correct virtual pointers; a function for receiving messages or datagrams containing object data elements and inserting them into a created dummy object; and a function for copying object data elements into a message or datagram and transmitting the same to another host computer.

This embodiment may be utilised in a system in which a single compiler compiles all copies of the code to run on the computers of the distributed system, but its use is not limited to this situation; an advantage of the embodiment is that an object may be sent from a first computer running code compiled by a first compiler to a second computer running code compiled by a second, different, compiler.

This invention is preferably employed together with that of UK patent applications 9600823.0 and 9600854.5, (and corresponding PCT publications WO 97/26596 and WO 97/26595) and UK application 9706400.0 filed Mar. 27, 1997, filed by the present applicant, all of which are incorporated herein by reference in their entirety.

Other aspects and embodiment of the invention are as described and claimed hereafter.

BRIEF DESCRIPTION OF THE DRAWINGS

Embodiments of the invention will now be illustrated, by way of example only, with reference to the accompanying draw in which:

FIG. 8 illustrates the data structure within memory of one component of FIG. 7a;

FIG. 12 illustrates the structure of an object location table held within memory as part of the object manager program of the host computer of FIG. 3;

FIG. 13 illustrates the structure of a host status table stored within the memory of the host computer of FIG. 3 as part of the object manager thereof;

DETAILED DESCRIPTION OF EXEMPLARY EMBODIMENTS

Figure 1:
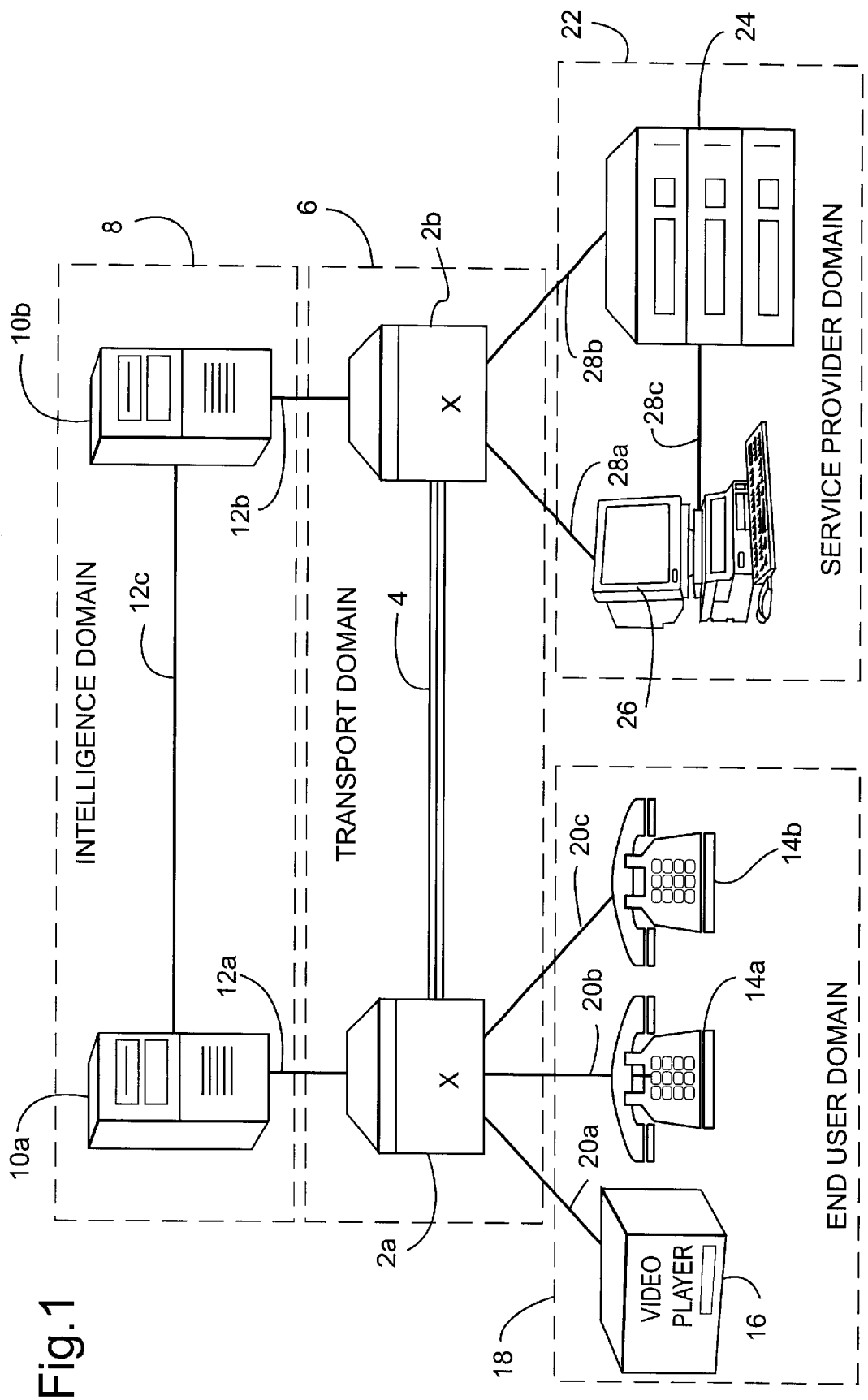
FIG. 1 is a block diagram illustrating the elements of a telecommunications systems embodying the invention.

Referring to FIG. 1, a telecommunications system produced according to the invention comprises a plurality of switching centres or exchanges 2a, 2b interconnected by communications channels 4 (e.g. microwave links, fibre-optic cables, coaxial copper cable or virtual circuits carried on any of the foregoing) making up a transport domain 6. Connected to the transport domain 6 is an intelligence domain 8 comprising a plurality of host computers 10a, 10b in signalling communication with the switch centres 2a, 2b via signalling links 12a 12b, 12c which also interconnect the host computers 10a, 10b. For example, the two may be interconnected using protocols such as a conventional signalling system (SS7).

End user apparatus such as telephones 14a, 14b and broad bandwidth communication devices such as video players 16, jointly comprise an end user domain 18 connected to the transport domain 6 via local loop connections 20a, 20b, 20c (for example optic fibre, cellular radio or twisted pair copper cable links).

Further provided is a service provider domain 22 consisting of equipment for providing services (for example video services), such as a video player 24 and a computer terminal 26, connected with the transport domain 6 via local loop connections 28a, 28b, 28c such as ISDN channels or other high bandwidth links.

In known fashion, an end user terminal 14 or 16 is used to pass a request, via the transport domain 6, to the service provider domain 22. As a result, a channel is set up through the tort domain 6 and the service provider domain 22 transmits a service via the channel to the end user domain 18 (for example by transmitting a real time video film, or a file of data in electronic format).

In conventional plain old telephone services (POTS), the transport domain 6 is controlled simply by the dialled numbers generated in the end user domain to set up the transport path. However, currently, "intelligent network" control of the transport domain is provided by the intelligence domain 8. The intelligence domain 8 receives from the transport domain 6 the dialled number and/or the dialling number, and performs some call processing in accordance with either the dialled or the dialling number, or both. The intelligence domain typically provides number translation services, where a dialled phone number is translated to provide a call forwarding service to another number. In this case, the dialled number corresponds to a stored record on one of the host computers 10, which is accessed in response to a signal on one of the links 12, to generate a corresponding re-direction number.

In general, in response to the occurrence of an event in the transport domain 6 (such as the initiation of a call from the end user domain 18) the intelligence domain supplies control information to control the transport domain 6.

Other data is also stored within the intelligence domain. In this embodiment, billing data for each call is stored in the intelligence domain, to enable periodic billing of each customer.

Figure 2:
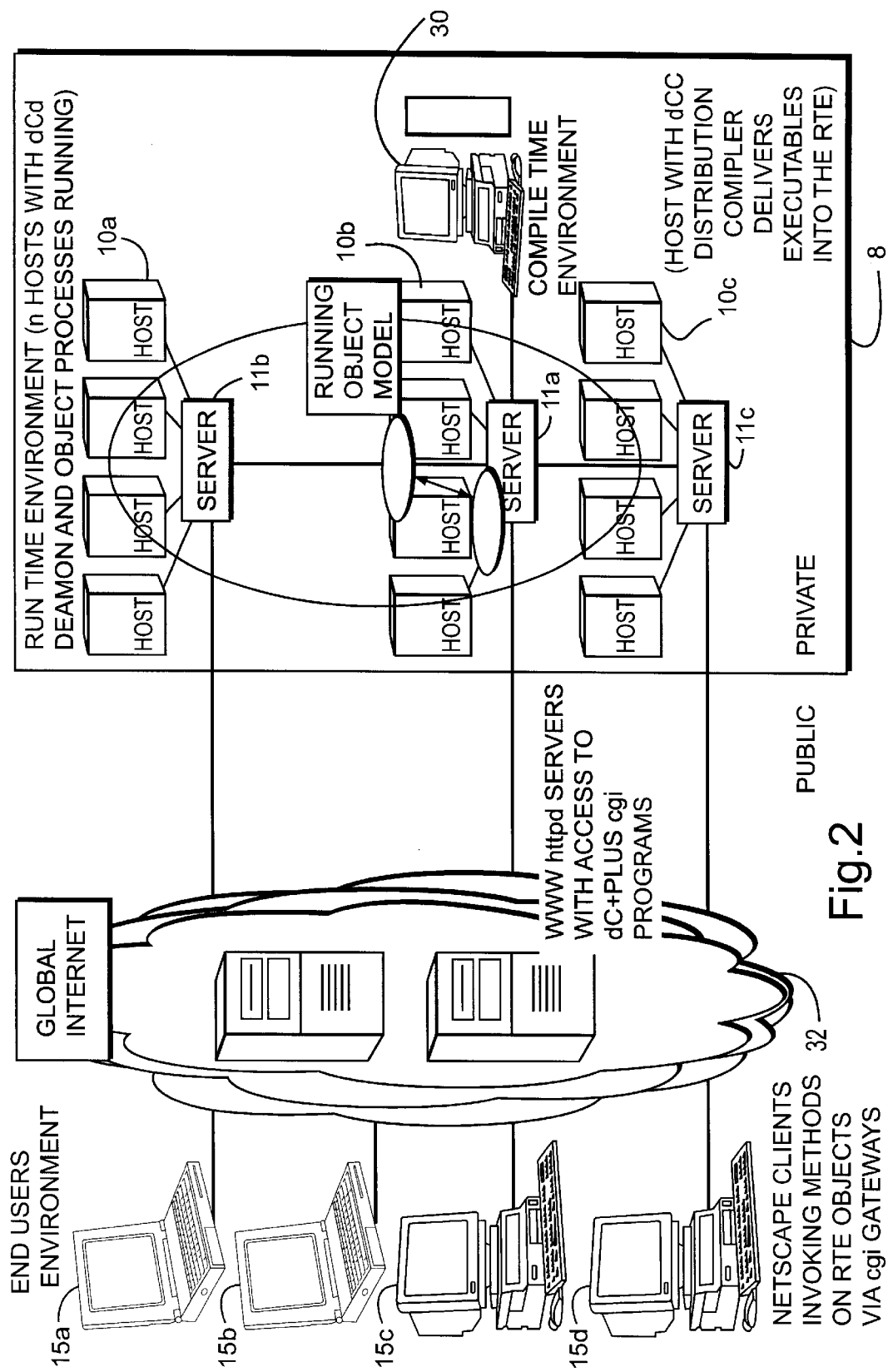
FIG. 2 is a block diagram illustrating further embodiments of the system of FIG. 1.

Referring to FIG. 2, the intelligence domain 8 further comprises a compiler apparatus 30, consisting of a programmed workstation, connected to the host computers 10 via network servers 11a–11c and a wide area network (WAN) running between the compiler apparatus 30, the hosts 10 and the servers 11.

The servers are also connected to one or more World Wide Web (WWW) server computers comprised within the Internet 32, and hence to editing terminals 15a–15d connected to the Internet (e.g. via a local packet switching node).

Figure 3:
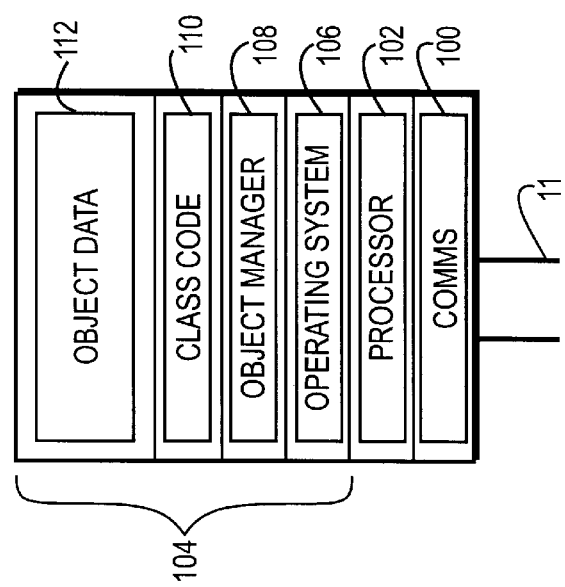
FIG. 3 is a block diagram illustrating the elements of a host computer forming part of the system of FIGS. 1 and 2.

Referring to FIG. 3, each host computer 10 comprises a mainframe or server comprising communications hardware 100 connected via the WAN to the servers 11; a processor 102; and storage 104, comprising both rapid access storage in the form of random access memory and offline storage in the form of magnetic or optical disc drives.

Stored within the storage apparatus 104 are an operating system 106 (e.g. UNIX (TM)); an object manager program 108; and an object model comprising class code 110 and object data, all of which will be discussed in greater detail below.

Each editing terminal comprises a personal computer, and may be connected via modem to a common telephone socket with a corresponding telephone 14 at a user's premises.

Each editing terminal therefore comprises a processor, a screen output device, an input device (e.g. keyboard and/or cursor control device such as a mouse), and storage apparatus ROM, RAM and a hard disc) containing a graphical user environment (e.g. Windows (TM), a communications program and a object browser program.

Figure 4:
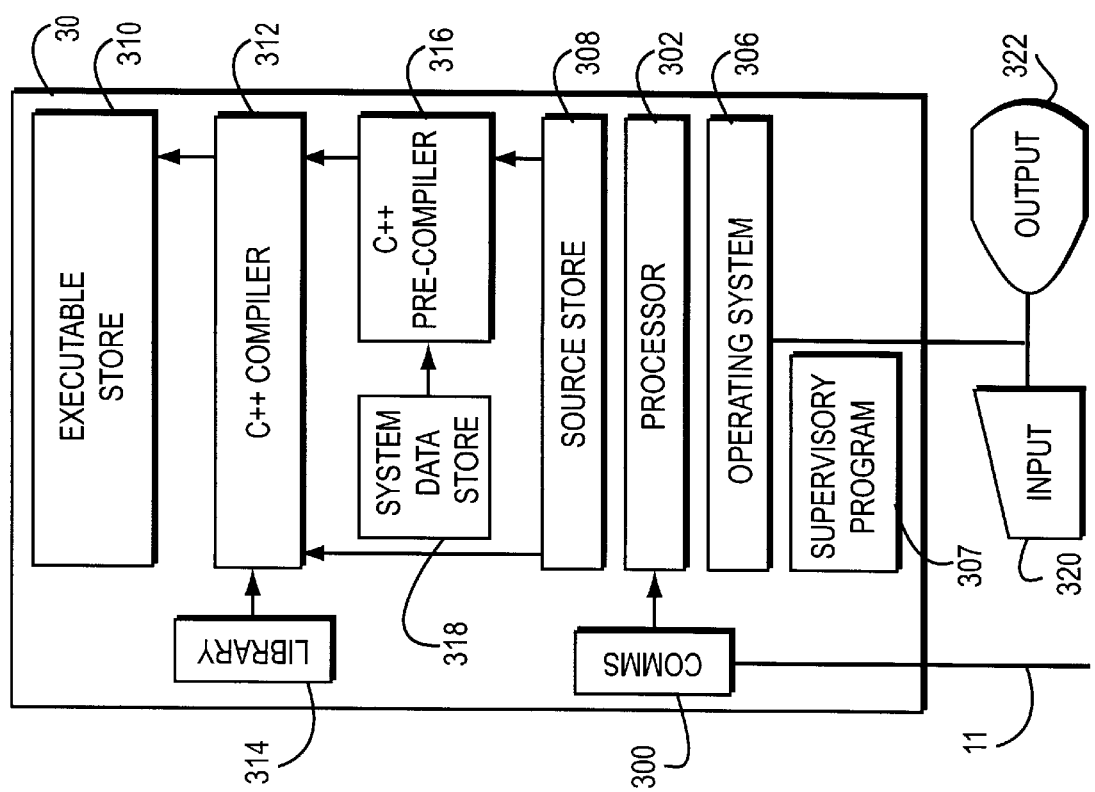
FIG. 4 is a block diagram illustrating the elements of a compiler apparatus forming part of the system of FIGS. 1 and 2.

Referring to FIG. 4, the compiler apparatus comprises a communications interface circuit board 300 connected to the WAN servers 11; a processor 302; and a storage apparatus (not indicated separately) comprising rapid-access memory (RAM) and high capacity memory (e.g. a hard disc drive) and storing an operating system (e.g. UNIX (TM)), a C++ compiler program 312) (such as SunPRO available from Sun Microsystems); a pre-compiler 316 to be described in greater detail below; and a library 314 storing standard functions and definitions (specifying subprograms or subroutines) to be incorporated into new programs.

Figure 6:
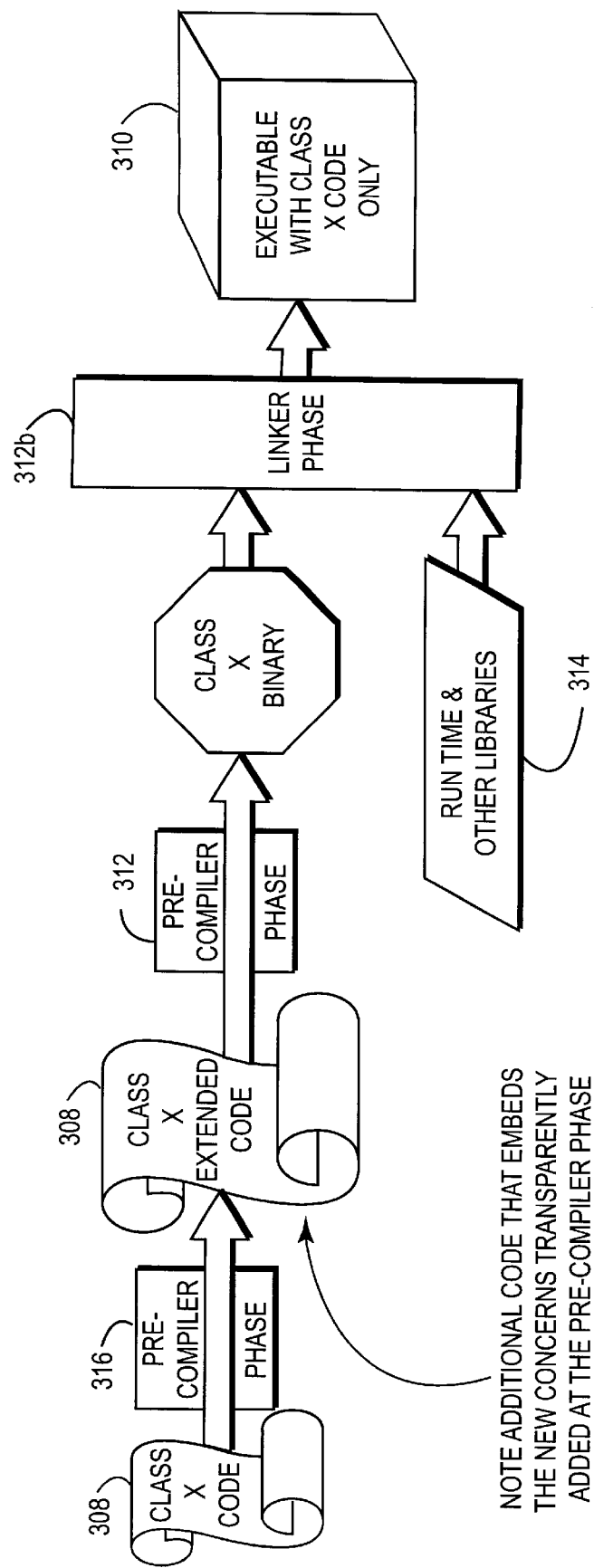
FIG. 6 is an illustrative drawing indicating the products of stages of processing performed in FIG. 5.

The C++ compiler comprises, as is conventional, a compiler which compiles to relocatable binary code and a linker program 312b (FIG. 6) which concatenates the binary code with the binary code-routines stored in the library 314 and locates the concatenated code in a memory address space for execution. Such compilers also generally include a preprocessor which interprets compiler directives, such as "include" statements to read in additional code, or perform other operations during compilations.

Also provided are: a storage area 308 for storing input source code defining a C++ program (e.g. input via the input device 320, or downloaded via the communications circuit 300, or loaded via a disc drive comprised within the storage apparatus 204); and a storage area 310 for storing executable code generated by the C++ computer 312 (i.e. by the processor 302 acting under control of the compiler program). Also included is a storage area 318 which stores system data concerning the number of distributed processors 10; the capacity of the available storage memory on each of the processors 10; the speed of operation of the processors 10 and so on.

The processor 302 is arranged to selectively run either the C++ compiler 312 on the source code in the source store 308, or the pre-compiler 316 followed by the C++ compiler 312 on the source code in the source store 308, to generate executable code in the executable code store 310.

In the former case, the code generated will execute on any suitable single processor. The processor 302 is, in the embodiment, itself arranged to be capable of executing the code directly generated in this manner by the C++ compiler, enabling the user to test immediately whether the program operates generally as expected.

In the latter case, the pre-compiler 316 first processes the source code in the source store 308 (taking into account any system data relating to the distributed system comprising the host 10 on which the code is to be executed), and generates amended source code in the source store 308 which is then compiled by the compiler 312 to generate executable code in the executable code store 310. This executable code is, however, not necessarily executable on the compiler apparatus 30 since it is for execution on the multiple distributed hosts 10.

Figure 5:
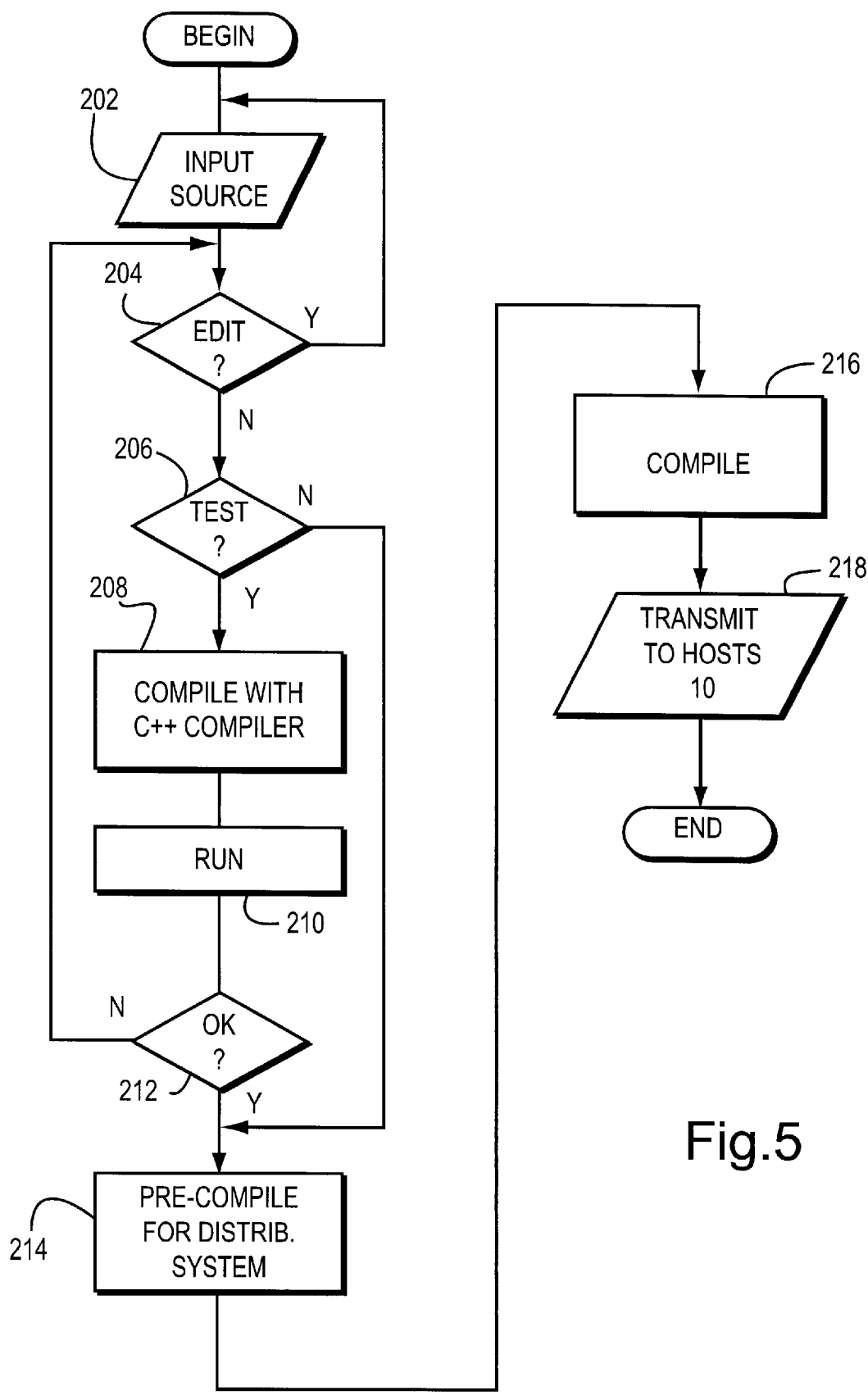
FIG. 5 is a flow diagram illustrating the operation of the compiler apparatus of FIG. 4.

Referring to FIG. 5. the general operation of the compiler 30 under control of the supervisory program 307 is as follows.

In a step 202, source code is input into the source code store 308 (e.g. via the input device 320). In a step 204, the human operator may decide to edit the source code in the source store 308, in which the edited text is input into the source store 308 (e.g. using a conventional text processor).

Once any such editing is complete, in a step 206, the user may elect whether or not to test the source code locally. In the event that he does so, in a step 208 the processor executes the C++ compiler 312 on the source code in the source code store 308 to produce executable code in the executable code store 310, and in a step 210 the processor 302 executes the executable code. A simulation program may be provided to intercept meaningless operations and substitute operations such as displaying on the output screen 322, to enable the user to see what is happening.

In the event that errors occur in the execution, in a step 212 the user may decide to return to step 204 to edit the source code in the source code store 308. If the source code appears satisfactory, then in a step 214, the pre-compiler 316 is applied to the source code in the source code store 308 to generate amended code, which is then compiled in a step 216 by the C++ compiler to generate executable code in the executable code store 310. This is then transmitted to the distributed host computers 10 in a step 218 via the WAN servers 11. This is illustrated graphically in FIG. 6.

The data model employed within the intelligence domain will now briefly be described. In the following, each "object" is a data record comprising a number of fields of data, which is accessed only by code which corresponds to that object (in a one to many relationship, in the sense that the same code which relates to a class of objects actually accesses all objects of that class).

As is conventional, objects are grouped into classes, the objects of the same class containing different data but in the same format. Each object is associated also with one or more subroutines (generally termed "methods" or "functions") which operate on the data, and which generally constitute the only means of doing so.

The formats in which the subroutines associated with different objects of the same class will receive and return corresponding data are the same (i.e. all objects of the same class have a common interface). In fact, in C++ the subroutines are only represented once for all objects of the same class (i.e. the code for the sub routines is only stored once) so that the code and the objects are in a one to many relationship. The code is therefore associated with the class of the objects rather than with each object.

Each class of object may be a subdivision of a more generic class, as is conventional in object oriented programming. In his case, the code may be stored instead in relation to the more generic class (the "superclass"). The object manager 108 contains a list of the locations of the data making up each object, and on each invocation of (i.e. call to), an object, the object manager accesses the relevant subroutine code within the class code storage area 110 and supplies to the code the address of the data for the relevant object within the object storage area 112.

Figure 7A:
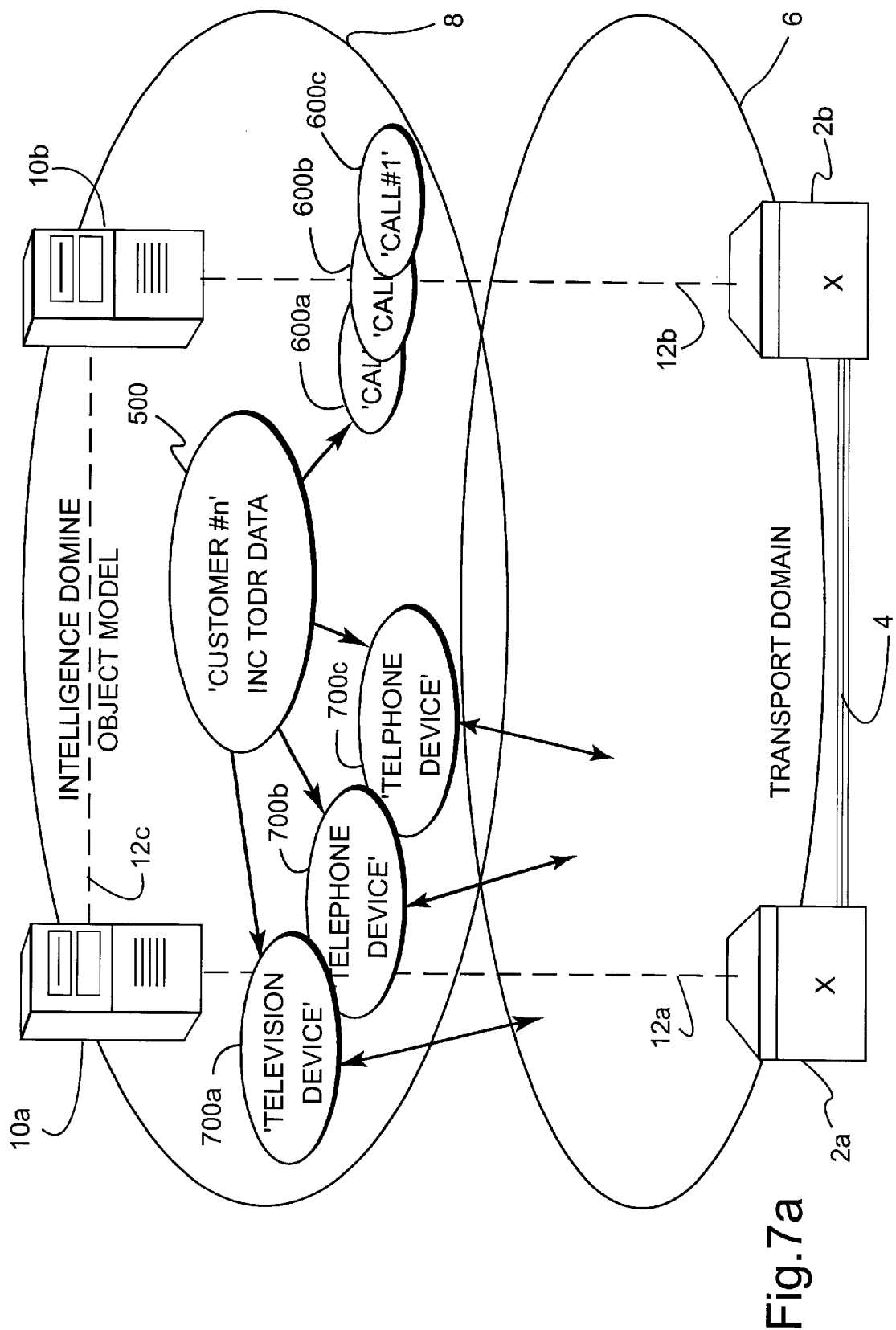
FIG. 7a is a diagram representing the structure of data held within the intelligence domain forming part of FIG. 1.
Figure 7B:
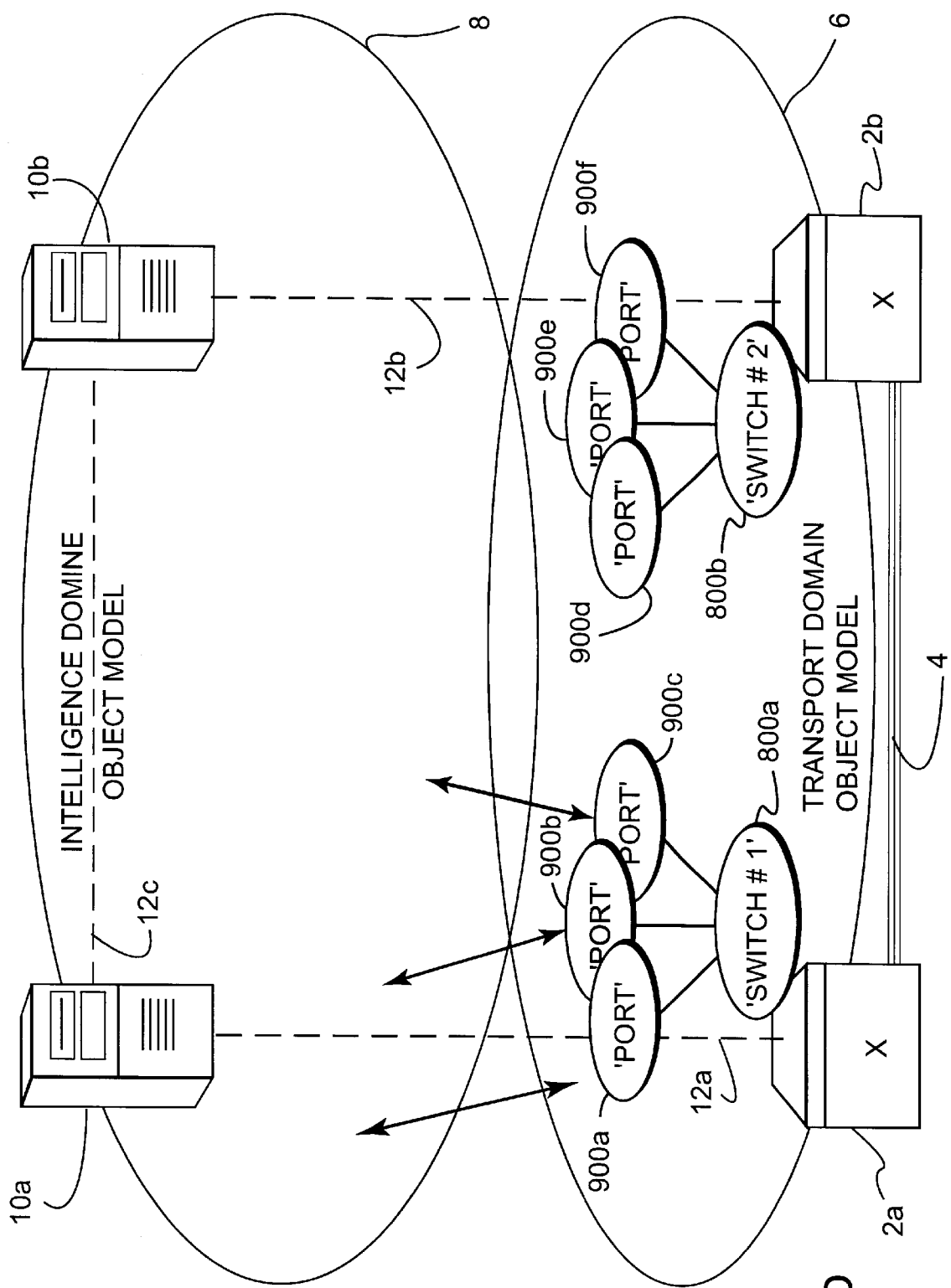
FIG. 7b is a diagram representing the structure of data held within the transport domain forming pat of FIG. 1.

Referring to FIGS. 7a and 7b, in this embodiment the objects provided within the hosts 10 of the intelligence domain comprise a plurality of customer objects 500 (one holding data relating to each of tens of millions of customers) which are created on the accession of a new customer, destroyed when the customer voluntarily departs or is cut off from the network; and edited when a customer's requirements change: a plurality of call objects 600a–600c which are created at the outset of call and destroyed after the termination of the call; and a plurality of communication device objects 700a–700c which each relate to an item of customer terminal equipment, and are created on first connection of that customer terminal equipment to the network.

Referring to FIG. 7b, in this embodiment the switching centres 2a, 2b . . . of the transport domain 6 further comprise host computers on which are stored objects 800a–800b, 900a–900f which represent, respectively, the switches and the ports of the switches within the switching centres. Thus, each switch object 800 contains a record of the state of the corresponding switch at any moment; these objects exist permanently in memory and have a one to one mapping to the physical devices present in the switching centres 2, so that writing to the port or switch objects changes the state of the respective ports or switches, and reading the port or switch objects gives an accurate reflection of the actual condition of the corresponding physical devices.

By way of example, the structure of data within a customer object is illustrated in FIG. 8.

The attribute data maintained by the object 500 comprises a customer type field 502 (which may indicate that the customer is an employee or some other unusual status, or is a normal customer); a user ID field 504; a host field 506 indicating the host 10 on which the object 500 was created (conveniently as a Uniform Resource Location (URL), compatible with http and TCP/IP).

Also stored is data relevant to the services provided to the customer, for example, the normal telephone number of the customer (field 508); a telephone number to which the customers calls are to be re-routed at particular times of day (field 510); and the times of day during which calls are to be re-routed (field 512).

Finally, billing information for the customer is stored, in the form of a call log field 514 storing, for each call, the called (and/or calling) telephone number, the date and time of the call, and the cost of the call (field 514).

Different parts of this information need to be accessed by different individuals. For example, the fields 508–512 which define the service to be offered to the customer may be edited by customer service personnel or by the customer himself via an end user terminal 15, whereas billing data (field 514) should be writable only by the billing and accounting personnel operating the network. Certainly, no customer should be able to re-write his billing records from an end user terminal 15.

In operation, the occurrence of events in the transport domain (such as the monitoring of an "off hook" condition within the end user domain) invokes the operation of the code associated with an object in the intelligence domain. For example, on a telephone going off hook in the end user domain, the code to create a new "call" object 600 is invoked. When the called number is detected, it is transmitted via the signalling links 12 to the intelligence domain 8; the customer object 500 of the calling party is activated to amend the billing record field thereof; and the customer object 500 of the called party is accessed to determine the number to which the call should be forwarded, which information is then transmitted to the switch objects 800 within the sport domain to set up the pat over which the call will be carried.

During the passage of a call, the role of the intelligence domain is usually limited. On clearing down a call on detection of the on hook event, the billing function code associated with the customer object(s) 500 updates the billing data field, and the call object is deleted by the object manager 108.

Figure 9:
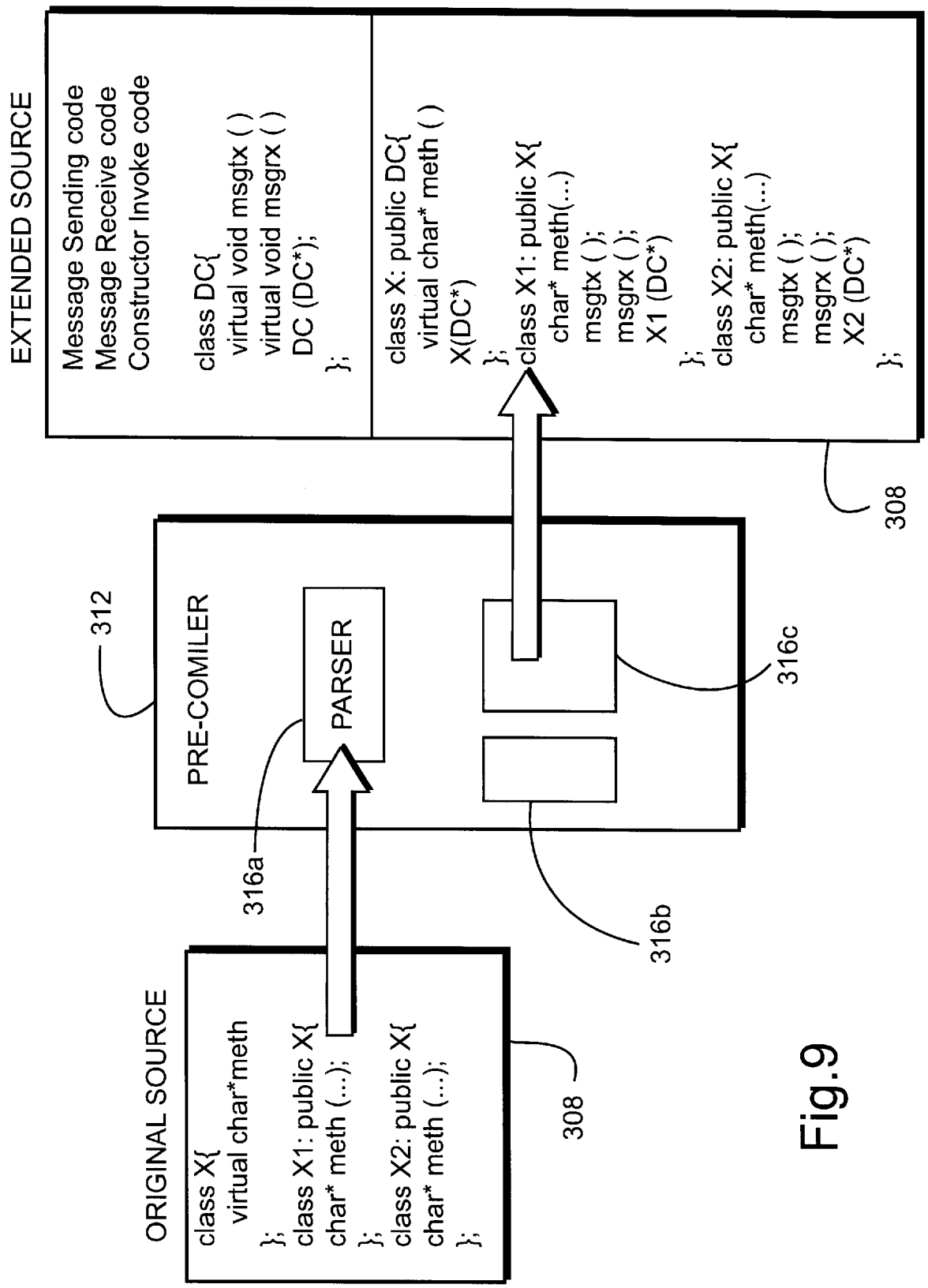
FIG. 9 illustrates the operation of the pre-compiler of FIG. 4 in augmenting original source code held in the source code store of FIG. 4 to produce extended source code.

Referring to FIG. 9, the pre-compiler 316 in this embodiment comprises a parser program 316a which examines successive C++ statements in the source code store 308 and refers to stored C++ syntax graphs 316b to determine which elements of each statement are functions, variables and so on; and a code writing program 316c which, on detection of predetermined syntax conditions by the parser 316a, creates corresponding additional source code which is added to the source code in the source code store 308.

Precompiler Operation

In general the precompiler 312 reviews the original source code, locates classes which include virtual functions, and generates extended source code which provides additional code to enable such functions to be moved.

Figure 10:
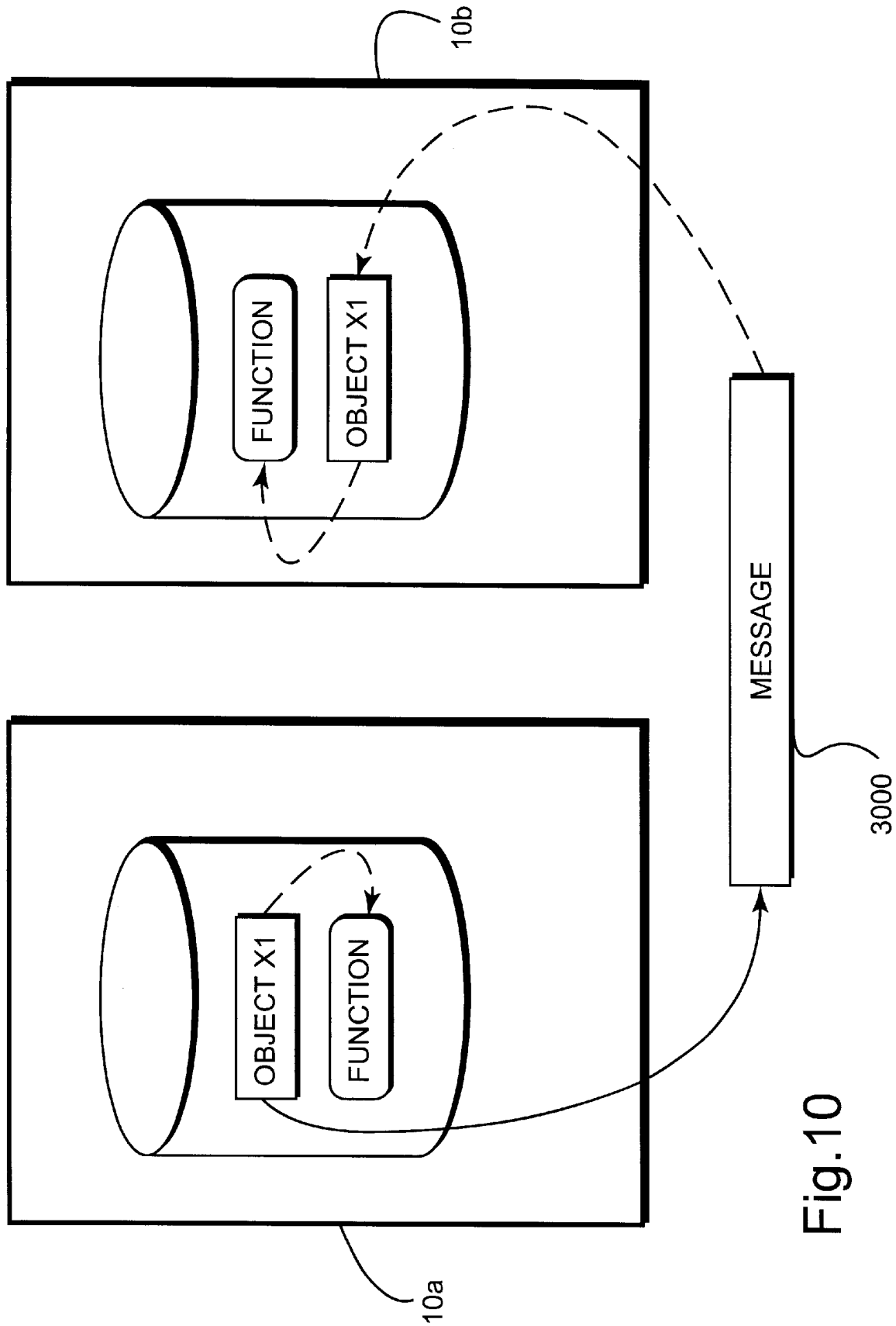
FIG. 10 illustrates schematically the movement of an object according to an embodiment of the invention.

FIG. 10 illustrates generally the objective of the added code. A first object X1 on a first processor 10a is to be moved to a second processor 10b. The object includes a pointer to a function F1, which is at a memory location M1 in the memory space of the processor 10a.

On the second processor 10b, the corresponding function F1 is at a memory location M2.

The data contained within the object X1 is moved by sending a message 3000 from the processor 10a to the processor 10b, the message containing the data elements of the object X1 but not the pointer value pointing to memory location M1.

Figure 11:
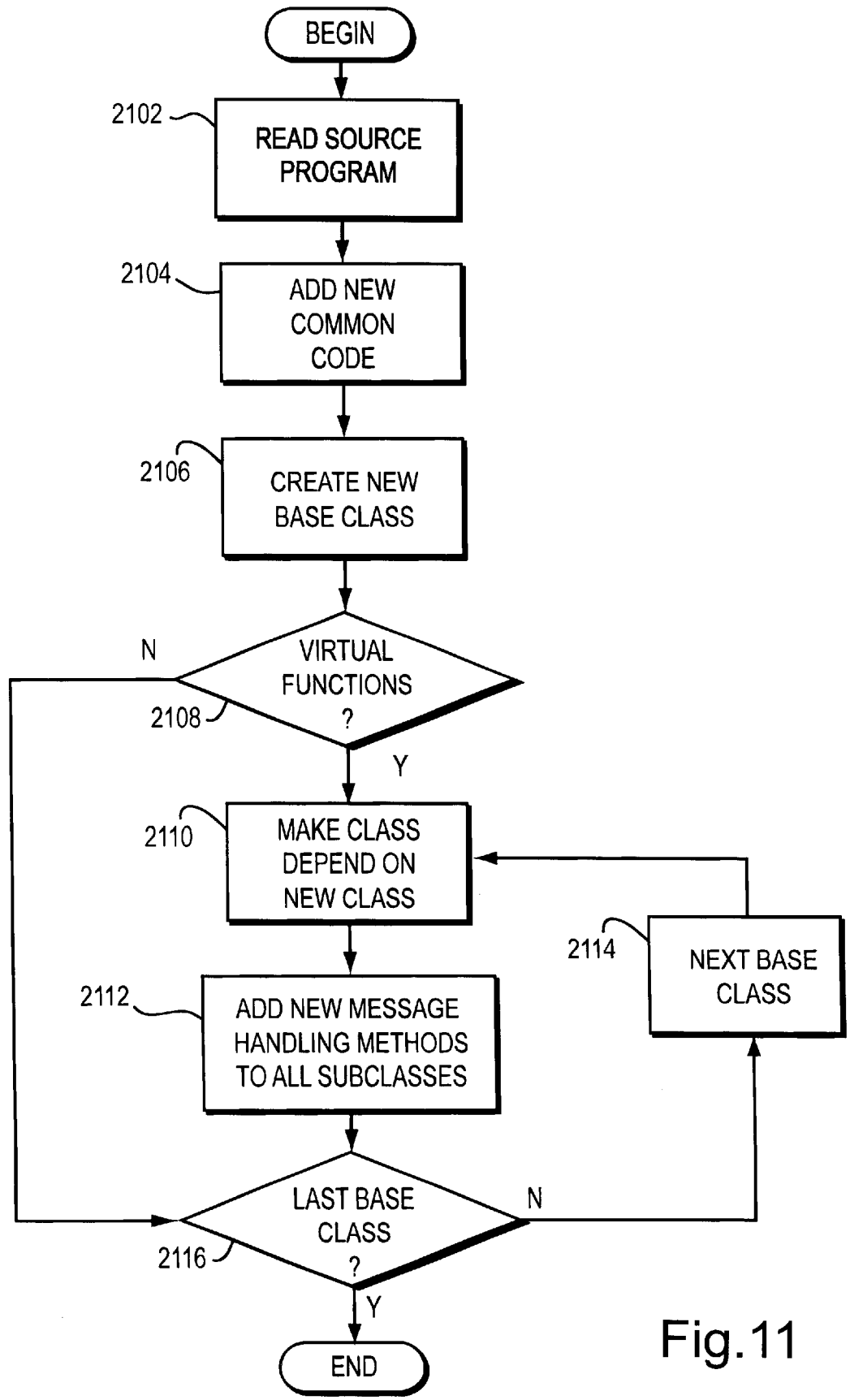
FIG. 11 is a flow diagram showing schematically the pre-compiling process performed in an embodiment of the invention.

Referring to FIG. 11, in a step 2102, the precompiler 312 reads the source program in the source code store 308, in a step 2106, the preprocessor creates a new base class (e.g. DC as shown in FIG. 9). The new base class may be included in the source code by a "#Include" statement to read in the new base class DC.

Within this new base class are two new vial fiction declarations; one ("msgtx") which corresponds to the operation of reading the data elements from an object on the host computer on which it is running and writing them into a message for transmission for a remote host computer, and one ("msgrx") for receiving a message from another host computer, extracting data elements from it and inserting the data elements into an existing object to replace the dummy data stored therein. There is also a function ("special constructor") for creating a new object and filling its data fields with null or dummy data.

The precompiler 312 also adds code (by including a #Include statement) to form part of the object manager program 108, specifically to send and receive messages and, on receipt of a message, to invoke the special constructor code to create a new null object in step 2104.

On each occasion (step 2108) on which the precompiler 312 encounters a class which declares a virtual function in the source code store 308, it amends the class declaration to make the class dependent on the new source class (DC), in step 2110.

Then (step 2112) the preprocessor 212 amendments the code for each subclass of the base class which declared the virtual function, so as to add definitions for each class of the three new functions defined in the new base class DC; in other words, code which reads the data values of an object of a class and packs them into a message; code which constructs a new object of the class and fills it with null data values; and code which unpacks a received message and edits the null data values to substitute the received data values.

This process is repeated (step 2114) until all classes which declare virtual functions have thus been processed (step 2116).

In the same operation, the precompiler 312 may perform the other operations referred to in our above referenced earlier patent applications.

Runtime Operation

The above description relates to the operation at the time of compiling. The operation of a distributed computing system produced as above will now be described at runtime.

Within each host processor 10, the object manager program 108 (the "daemon") comprises, as will be described in greater detail, processes for creating new objects; processes for determining the location (i.e. the host computer 10) on which given objects are stored; processes for sending messages to remote host computers; and processes for receiving messages therefrom.

Referring to FIG. 12, the object manager 108 for each host computer 10 comprises an object location table 1500 storing a list 1510 of the objects currently in existence by name, and, associated with the record 1510a–1510z for each object, an entry 1520a–1520z storing the host computer 10 on which the object is currently stored, and an entry 1530a–1530z storing the identity of the host computer on which the object was initially created.

Referring to FIG. 13, also stored within the object manager 108 is a host table 1600 comprising status data on each of the host computers, from which the most suitable host computer to create a new object on can be derived. This table therefore comprises a first set of entries 1610a–1610z storing the identities of each host computer; an associated second set of entries 1620a–1620z storing the amount of free memory available on that host computer; a third associated set of entries 1630a–1630z storing connectivity data for each of the host computers 10 (for example the number of other computers to which it is connected), and optionally other entries relating to, for example, processor speed.

Figure 14A:
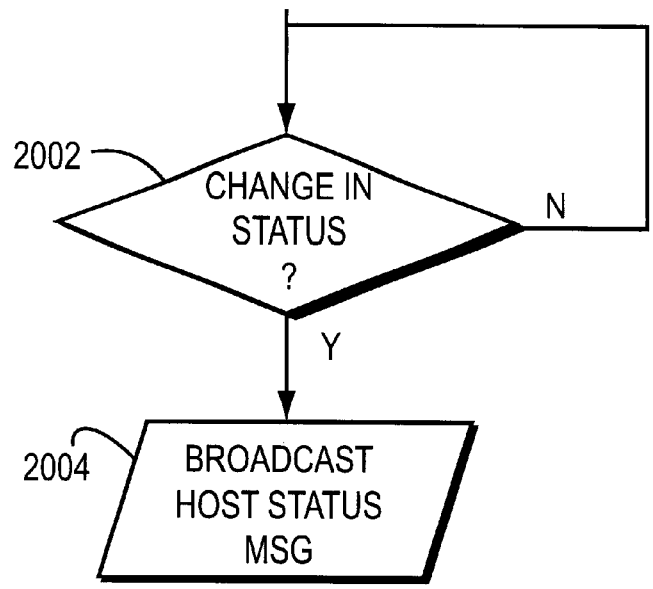
FIG. 14 (comprising FIGS. 14a and 14b) is a flow diagram illustrating the updating of the host status table.

Referring to FIG. 14a, the object manager 108 of each host computer 10 periodically interrogates the operating system 106 thereof to determine whether there has been any change in any of the data stored in the table 1600 for that processor (e.g. whether there is now less memory available than previously) in a step 2002 and, on detection of a significant change in any such item of information, in a step 2004 the object manager 108 causes the transmission of a broadcast message via the communications apparatus 100 to all other host computers 10 listed in the table 600, signalling the new information concerned.

Figure 14B:
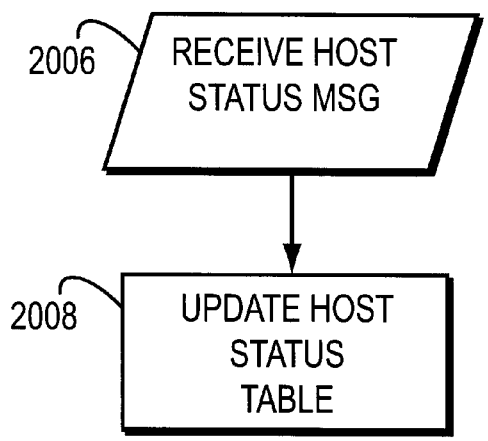

Referring to FIG. 14b, when any host computer 10 receives such a message in a step 2006, the object manager 108 thereof updates the status table 1600 of FIG. 13 to reflect the new information in a step 2008.

Thus, at any time, the object manager 108 of each host computer 10 maintains up to date status information for all other host computers, as well as its own, within the table 16 of FIG. 13.

Moving/copying an Object

Figure 15:
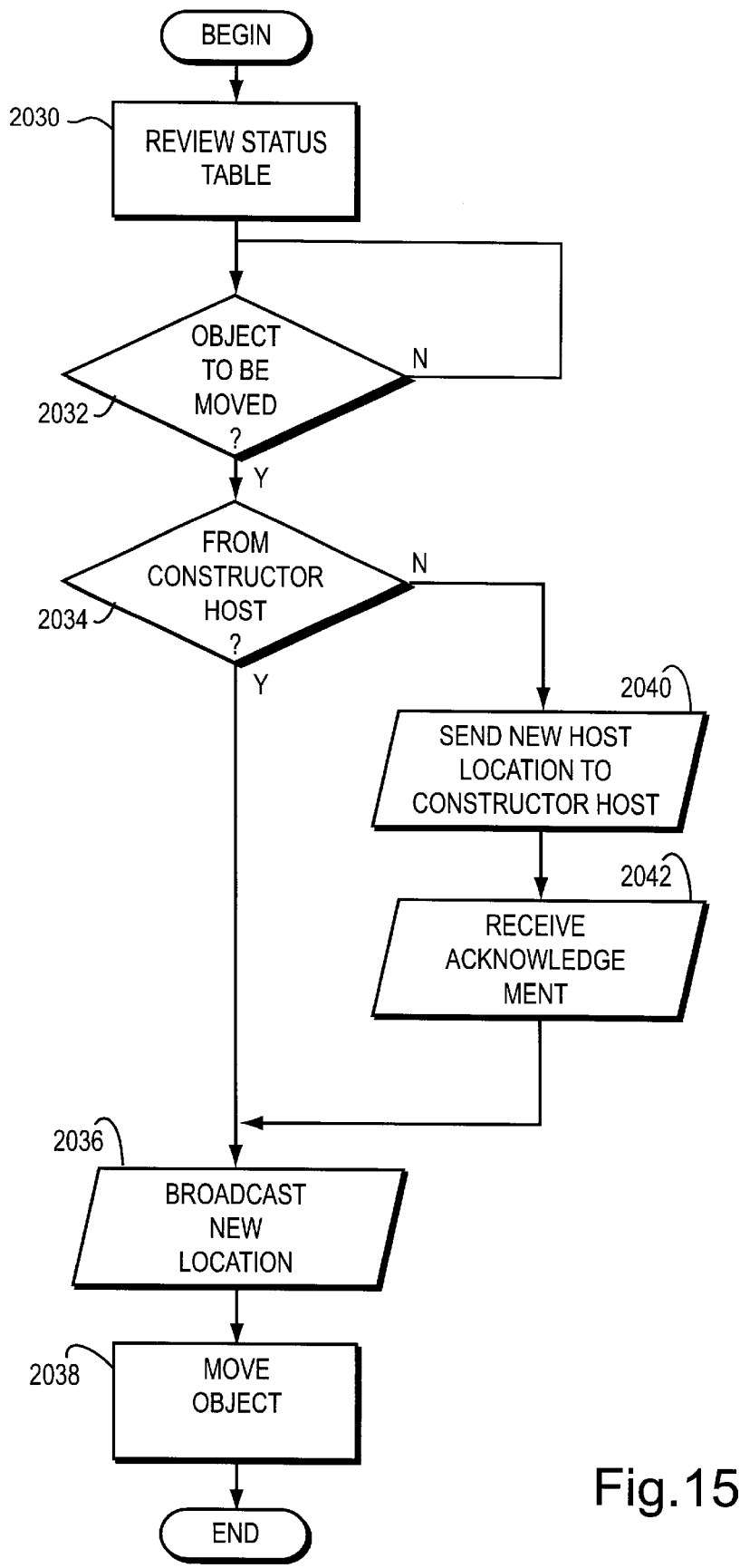
FIG. 15 is a flow diagram illustrating the process of moving an object from one host computer to another.

Referring to FIG. 15, objects need to permanently reside on a given host but may be moved from one host to another (i.e. deleted from the storage of one host and included in the storage memory of another).

In a step 2030, the object manager 108 for each host computer 10 reviews the status table 1500 thereof. In a step 2032, the object manager program 108 determines whether an object is to be moved from the host computer 10 on which the object manager 108 is resident; for example if that host computer 10 is running out of available memory. If so, a suitable object to move is selected (for example, a rarely accessed object).

In a step 2034, the object table 1500 is reviewed to determine, from the entry in the corresponding field 1530 for the object, whether the object is currently residing on the host on which it was created. If so, (i.e. if the object has not moved since it was created) then in a step 2036, a new host is selected (in exactly the same manner as described above in relation to creation of a new object) and in a step 2038, the object is moved.

If in step 2034 it is determined that the object is not currently resident on the host computer 10 on which it was created (i.e. the object has already moved since it was created), in a step 2040 the object manager sends a message with this new host location to the original host computer 10 on which the object was originally created (as determined from the entry 1530 and the table 1500 for the object) and, after receiving an acknowledgement from that original host computer in step 2042, proceeds as described above (step 2036).

The operation of moving an object (step 2038) will now be described in greater detail.

Figure 16A:
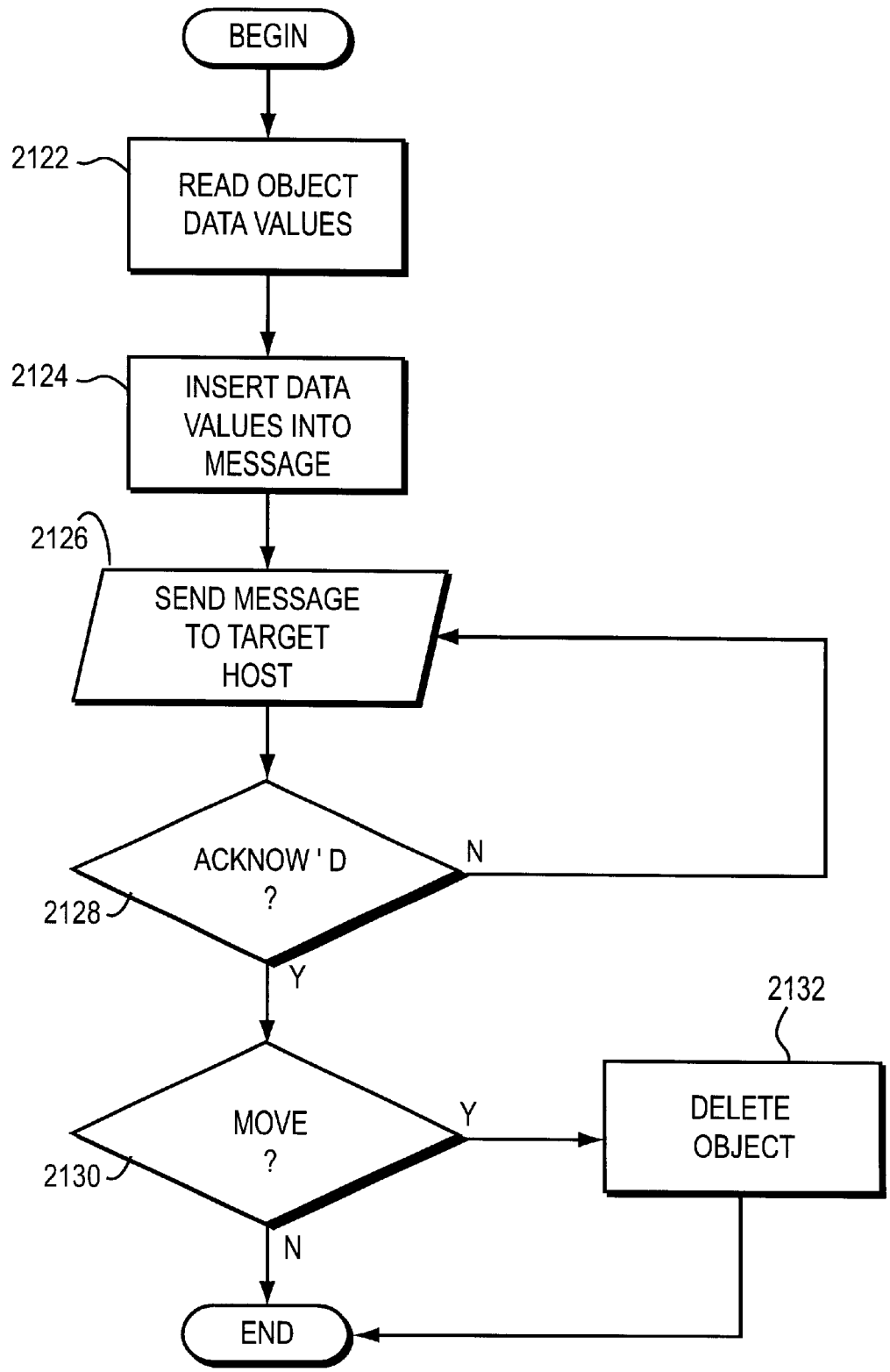
FIG. 16a is a flow diagram illustrating in greater detail part of the moving process of FIG. 15 performed at the originating computer.

Referring to FIG. 16a, where it is desired to move or copy an object from one host computer 10a to another 10b, in a step 2102, the object manager or "daemon" 108 calls the message packing function (msgtx) of the object to be moved, and this function packs the data elements of the object into a message format (step 2124).

Figures 17A, 17B:
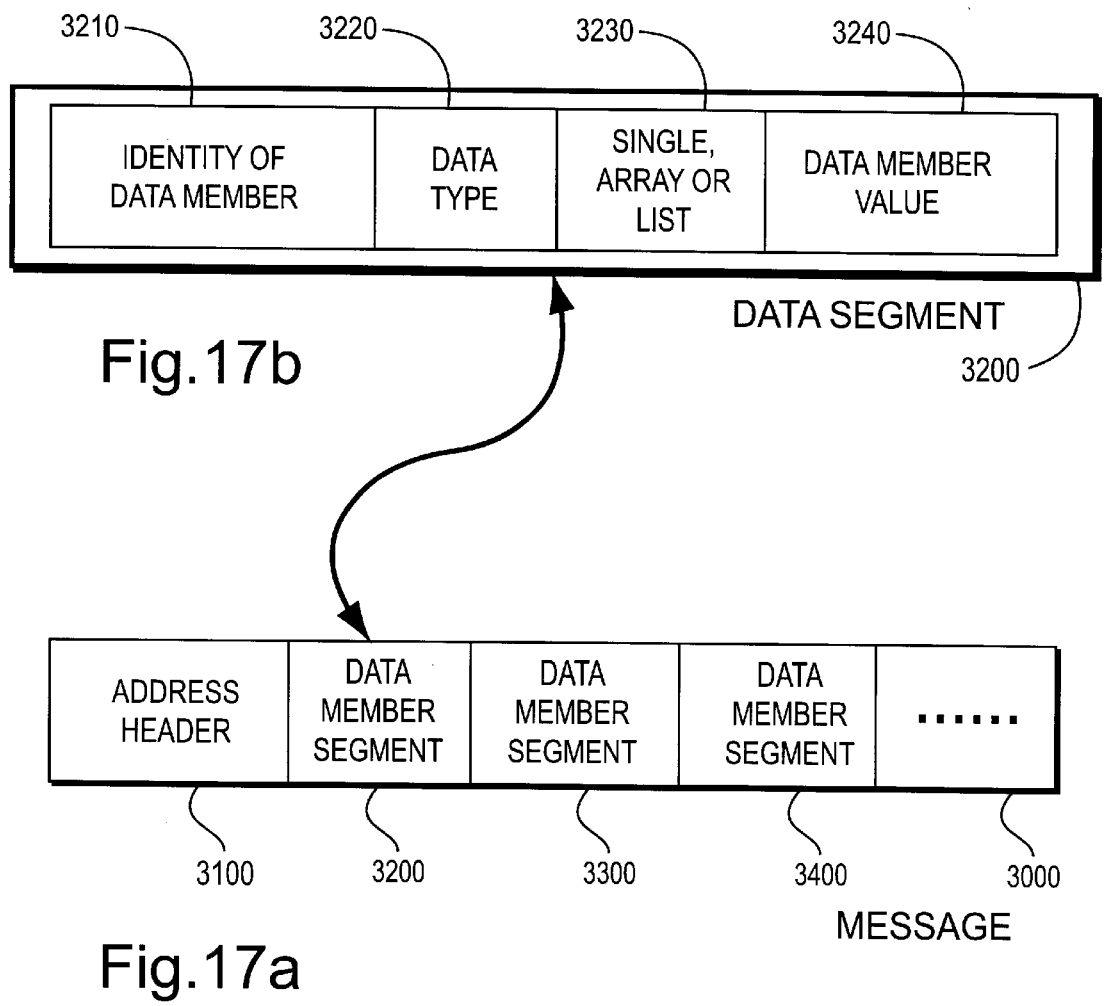
FIG. 17a shows the structure of a message used to convey an object in the embodiment.
FIG. 17b shows in greater detail a portion of that message.

Referring to FIG. 17a, the message 3000 consists of a header 3100 containing routing information (i.e. the address of the host computer 10b for which the object is destined) and information identifying the object (e.g. its name); and a plurality of data member segments 3200, 3300, 3400, . . .

Referring to FIG. 17b, a data segment 3200 consists of a header portion 3210, identifying the data member stored within the segment (e.g. by its field name); a data type field 3220 identifying the type of the data (e.g. single precision, double precision, floating point, string and so on); a field 3230 specifying whether the data member is a single element, an array element or a list element; and a field 3240 specifying the value of the data member.

Referring once more to FIG. 16a, in a step 2126, the first processor 10a, under control of the message sending code of the object manager program 108, transmits the message 3000 to the second processor 10b. If no acknowledgement is received (step 2128) the message is retransmitted. On receiving an acknowledgement that the message was received, if (step 2130) the operation was an object moving operation, then the object manager program 108 deletes the object from the memory of the processor 10a (step 2132). Otherwise, if the operation was an object copying operation, the object is not deleted.

Figure 16B:
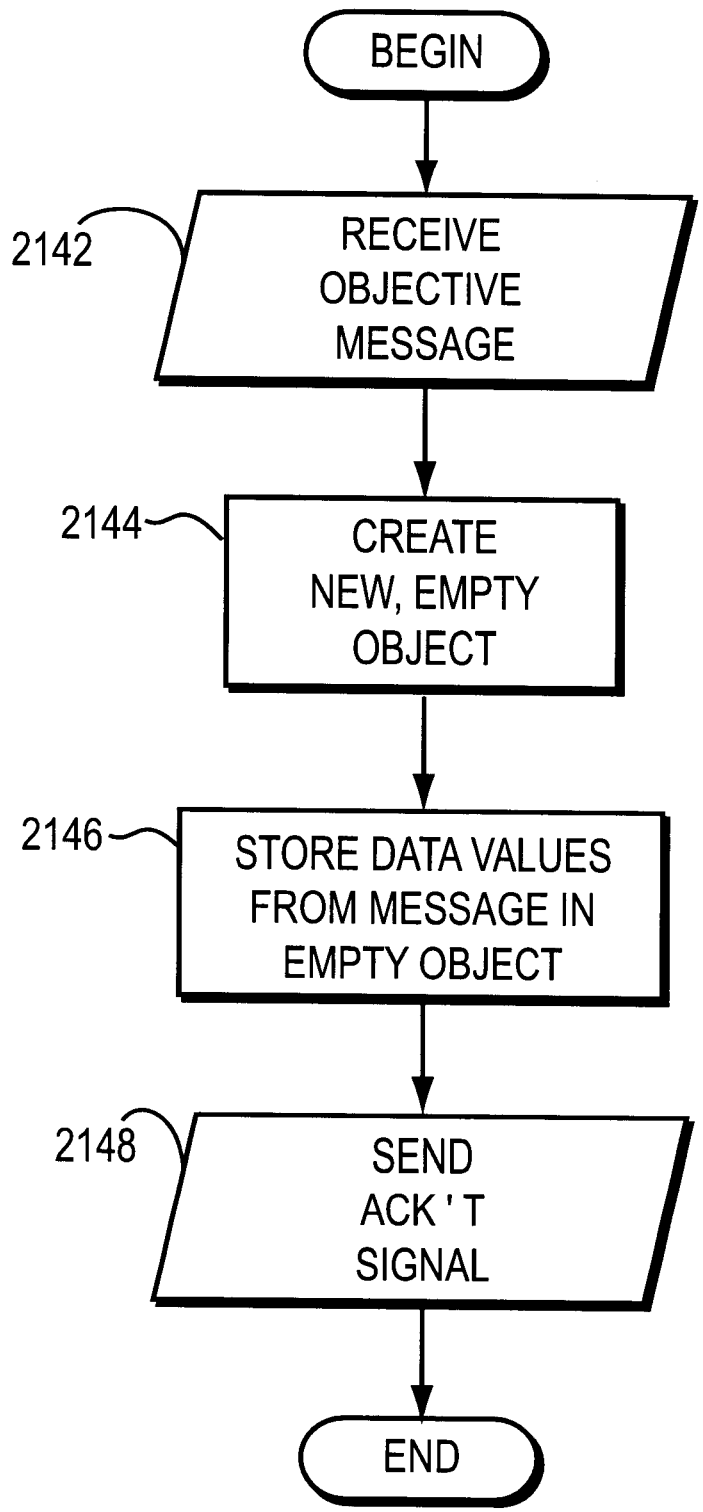
FIG. 16b shows the corresponding process performed at the destination computer.

Referring to FIG. 16b, at the remote processor 10b, the message is received (step 2142) and, in step 2144, the object manager program 108 determines the object name and class, and invokes the special creator function to create a new object of the required name, but with all data values set to null.

The special constructor function acts as would a normal constructor function for an object of the class specified, and therefore creates an area of memory for each variable type declared for that class. It also creates a pointer to the virtual pointer table (vtab) for that class. The vtab points to the addresses of the virtual functions declared within that class.

Thus, all the vtab pointers in the newly created object now point to the correct locations at the target computer.

Then (step 2146) the object manager program 108 invokes the message unpacking function (msgrx) to store the received data element values in the corresponding data elements of the newly created object, overwriting the null values.

Finally, in step 2148, the object manager program 108 on the processor 10b transmit back an acknowledgement signal to the processor 10a to acknowledge receipt of the object data.

Other Runtime Aspects

Figure 18A:
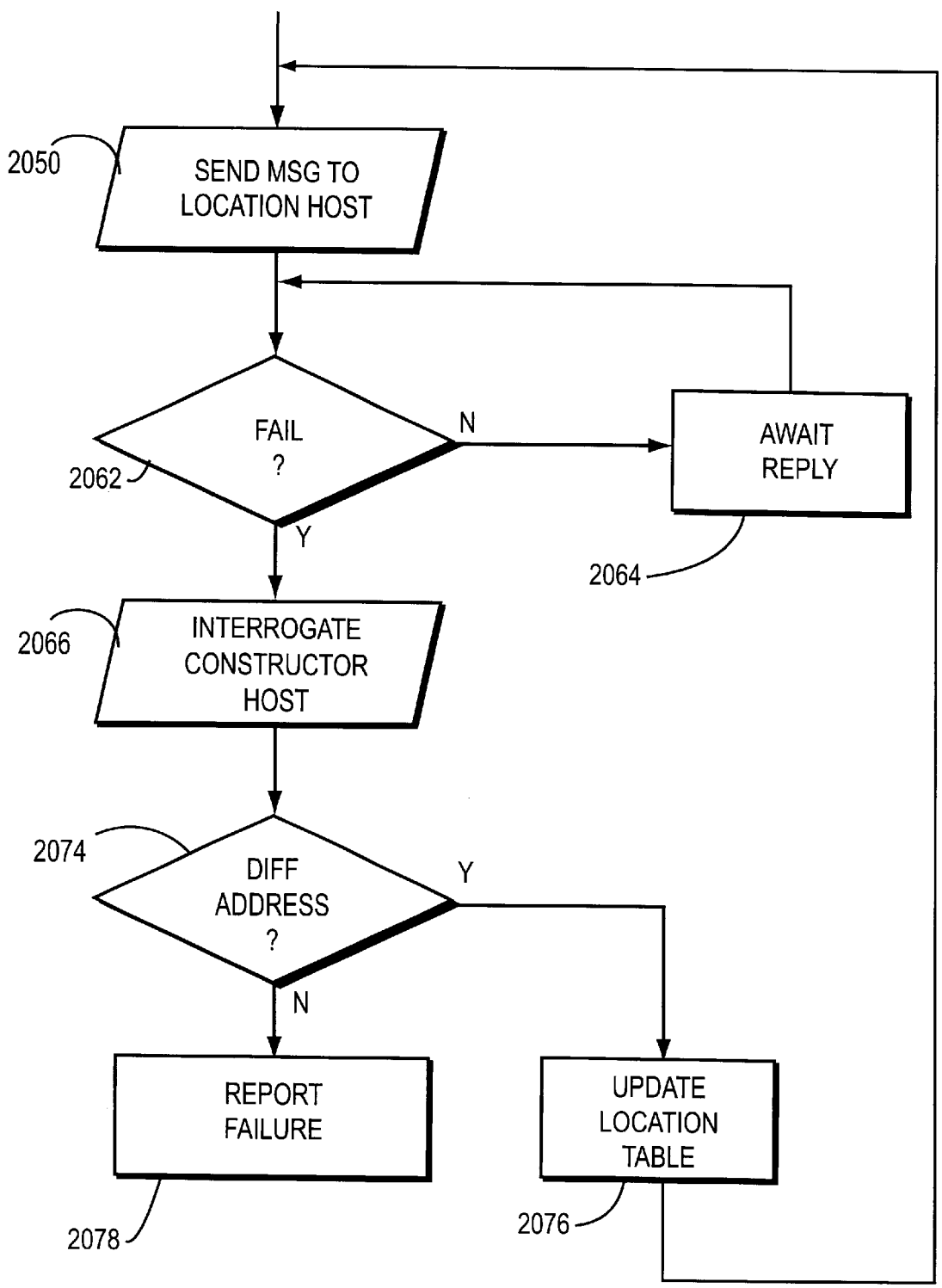
FIG. 18 (comprising FIGS. 18a, 18b and 18c) is a flow diagram showing the process of transmitting a message to an object on a remote host computer.

Referring to FIG. 18a, the use of the object location table 1500 will now be described in greater detail.

When a message is to be sent to an object, initially the object manager 108 determines the current host processor 10, on which the object is recorded as being located, within the object located table 1500, and sends a message, calling the object, to that current host in a step 2050.

In most instances, messages will reach the correct hosts but it is possible that, due to interference during communications or some other cause, the object location table 1500 may not be completely up to date, so that the called object is not (or is no longer) on the indicated host computer.

Figure 18B:
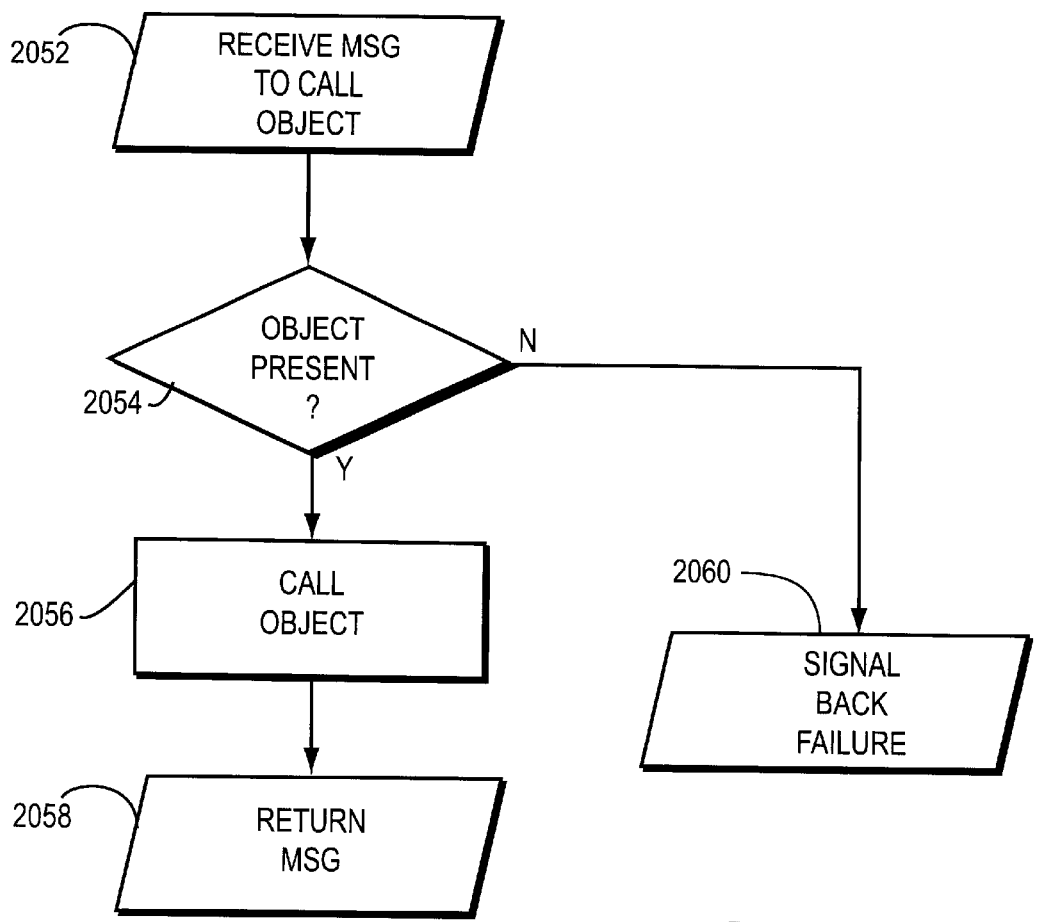

Referring to FIG. 18b, when the host computer 10 to which the message is addressed receives the message in a step 2052, it determines whether or not the object is recorded as being present within its own object location table 1500 in a step 2054. If present, the object is called in a step 2056 and any return message is transmitted back in step 2058, as described above.

If not, then in a step 2060, the host computer signals back a failure to call the object.

The originating host computer, on receiving such a message in a step 2062, then sends an interrogation message to he original host computer 10 which is recorded in the table 1500 as being that on which the object in question was originally constructed, in a step 2066. Because of the separate location signalling steps 2040, 2042 of FIG. 15, the object location table 1500 on the original host on which the object was constructed should be fully up to date in respect of that object.

Figure 18C:
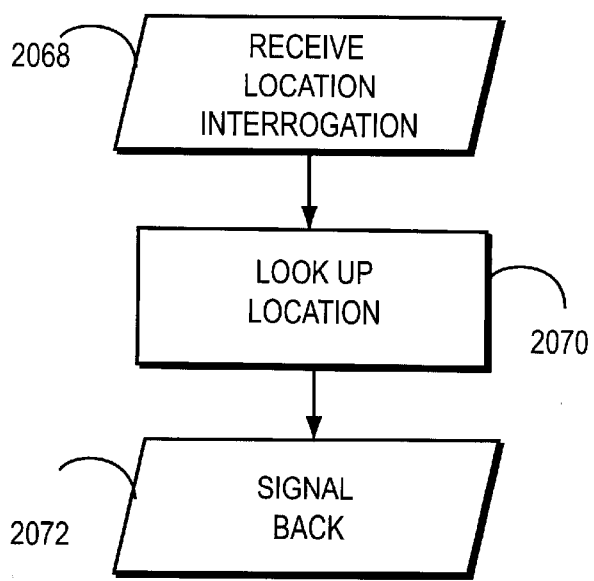

Referring to FIG. 18c, when the original host computer receives, in step 2068, a location interrogation signal the object manager 108 thereof refers to the object location table comprised within it in a step 2070, and signals back the determined location of the object concerned in a step 2072.

The first host computer receives the location signal from the original host and determines, in a step 2074 of FIG. 18a, whether the host computer thus indicated as the location of the object differs from that to which a message for the object has already been directed in step 2050. If so, the object manager 108 updates the location table 1500 in a step 2076, and returns to step 2050 to repeat transmission of the message to the newly indicated host computer 10 location for the object.

If the address received is the same as the address to which the message was previously directed, in a step 2078 the object manager program 108 return a message indicating a failure to reach the object to the object, process or user from whence the attempt to call the object originated.

It will thus be seen that, in this embodiment, each host computer 10 carries an object location table in which the location of all object in the system is recorded, and each host is therefore able to operate autonomously, without reference to the central database, to call other objects on different host computers. Nonetheless, a higher level of integrity is added by providing that each host computer 10 additionally keeps track of the locations of all objects which were originally created on that host computer, even if the location of those objects subsequently moves to a different host computer.

Furthermore, it will be apparent that each host computer 10 maintains accurate records of those objects which are located within its own storage area.

Other Embodiments and Modifications

It would, of course, be possible to provide separate tables for the objects stored locally within each host computer and for the objects originally created on that host computer, as well as those objects stored on other host computers. However, providing a single table storing all object locations ensures greater flexibility, since all object location tables 1500 of all host processors 10 will be substantially identical, making it possible in the event of the expansion of the distributed computing system to include a new host processor system to copy the object location table from any one host processor onto a new host processor.

It will be apparent from the foregoing that many modifications and substitutions are possible. For example, although, for the reasons above, it is convenient to provide the invention as a pre-compiler cooperating with a conventional C++ compiler, it would equally be possible to integrate the present invention into an unconventional compiler (and indeed the combination of pre-compiler and compiler may be considered to comprise exactly this).

Naturally, the invention is usable not only with C++ but with other object oriented languages such as Smalltalk (TM) which are to be provided in a distributed environment. More generally, it would be possible to utilise equivalent techniques with a non object-oriented language and on a non-distributed system.

Whilst the invention has been described as including the compiler apparatus within a telecommunications system, it will be realised that in practice the compiler apparatus could be in a different jurisdiction and linked to the host computers via an international telecommunications network; accordingly, protection is claimed for the compiler apparatus both in combination with and in isolation from the telecommunications network with which it is used.

Naturally, applications other than telecommunications are possible, such as for example shared distributed computing.

Many other alternatives and modifications will be apparent to the skilled person. Accordingly, the present invention is intended to encompass any and all subject matter disclosed herein, whether or not covered by the accompanying claims.

Whilst in the foregoing, reference is made to a single compiler generating code for all target processor, but it will be understood that the effect of the above described embodiment is to permit different processors in a distributed object oriented system to exchange objects which include virtual pointers, even where the processors are operating under control of programs compiled by different compilers, since the format in which the objects are transferred includes no dependence upon the memory mapping of either processor.

It will naturally be recognised that, whilst in the above described embodiment the sending of the virtual pointer table is unnecessary, nonetheless it would be possible to include the virtual pointers in the data message provided that at the receiving computer they were discarded, and such embodiments are to be understood to fall within the scope of the present invention.

What is claimed is:

1. A compiler apparatus for use with a distributed control system comprising a plurality of interconnected computers, said compiler apparatus comprising a compiler arranged to compile a source program; and a pre-compiler including:

means to receive an original source program which has been written for single-computer execution in a source language which supports defined classes each including functions, said classes including hierarchical references to more generic classes, referred to as "inheritance", and objects within said classes having a plurality of data elements and one or more pointers to one or more respective virtual function tables within the memory space of the computer on which the particular object was created, and means to amend said original source program to add additional source code such that, when the amended source program is compiled by the compiler and run on said plurality of interconnected computers, for each object created by a computer of said plurality of interconnected computers, referred to as a creating computer, a respective data element location list is created of the respective locations of said data elements within such object, and when said creating computer commands the creation of a replica object on another computer of said plurality of interconnected computers, referred to as a replicating computer, a Make Replica message is generated containing the name of the object to be replicated and data values copied from only the locations specified in the data element location list corresponding to the object to be replicated, and the Make replica message is sent to said another computer, and when a said replicating computer receives a said Make Replica message it creates a replica-designate object containing a corresponding number of data elements and corresponding one or more pointers to corresponding one or more respective virtual function tables within the memory space of the said replicating computer, and copies the data values from the received Make Replica message into said corresponding number of data elements.

2. A distributed computing system comprising a plurality of interconnected computers, wherein each computer comprises a memory space storing objects having a plurality of data elements and one or more pointers to one or more respective virtual function tables stored within that memory space and including:

means for generating a respective data element location list of the locations of data elements within each such stored object;

means for generating a Make Replica message containing the name of an object to be replicated on another computer of said plurality of interconnected computers, and containing data values copied from only the locations specified in the data element location list corresponding to the object to be replicated;

means for sending the Make Replica message to said another computer; and means for receiving a Make Replica message from another computer of said plurality of interconnected computers and, in accordance with the name and data values of a received Make Replica message, creating a replica-designate object containing a corresponding number of data elements and corresponding one or more pointers to corresponding one or more respective virtual function tables within the memory space of the said replicating computer, and copying the data values from the received Make Replica message into said corresponding number of data elements, thereby converting the replica-designate object into a replica object.

3. A system as in claim 2, in which, when a computer sends a Make Replica message to said another computer, it also deletes the object to be replicated, and signals the identity of said another computer to each other computer.

4. A system as in claim 2 in which each computer stores an object location table detailing the objects held on the computer.

5. A system as in claim 4 in which each said object location table stores also the location of the host computer on which the object was originally created.

6. A system as in claim 5 in which, to access a data record, each of said computers is arranged to read the object location table it stores and then, if necessary, to access the object location table of the host computer on which the object was originally created.

7. A telecommunications system comprising a distributed computing system according to claim 2, together with a telecommunications network.

8. A telecommunications system according to claim 7 further comprising compiler apparatus for compiling programs for said computers.

9. A system according to claim 8 in which the compiler apparatus is a compiler apparatus for use with a distributed control system comprising a plurality of interconnected computers, said compiler apparatus comprising a compiler arranged to compile a source program; and a pre-compiler including:

means to receive an original source program which has been written for single-computer execution in a source language which supports defined classes each including functions, said classes including hierarchical references to more generic classes, referred to as "inheritance", and objects within said classes having a plurality of data elements and one or more pointers to one or more respective virtual function tables within the memory space of the computer on which the particular object was created, and means to amend said original source program to add additional source code such that, when the amended source program is compiled by the compiler and run on said plurality of interconnected computers, for each object created by a computer of said plurality of interconnected computers, referred to as a creating computer, a respective data element location list is created of the respective locations of said data elements within such object, and when said creating computer commands the creation of a replica object on another computer of said plurality of interconnected computers, referred to as a replicating computer, a Make Replica message is generated containing the name of the object to be replicated and data values copied from only the locations specified in the data element location list corresponding to the object to be replicated, and the Make replica message is sent to said another computer, and when a said replicating computer receives a said Make Replica message it creates a replica-designate object containing a corresponding number of data elements and corresponding one or more pointers to corresponding one or more respective virtual function tables within the memory space of the said replicating computer, and copies the data values from the received Make Replica message into said corresponding number of data elements.

10. A method of creating on a second computer a replica of an object present on a first computer, said object having a plurality of data elements and one or more pointers to one or more respective virtual function tables within the memory space of said first computer, the method comprising:

creating a data element location list of the locations of said plurality of data element location list of the locations of said plurality of data elements within said object;

generating at said first computer a Make Replica message containing the name of said object and data values copied from only the locations specified in said data element location list;

transmitting said Make Replica message from said first computer to said second computer;

receiving said Make Replica message at said second computer;

creating at said second computer a replica-designate object which is named and dimensioned to correspond to said object, and which contains corresponding one or more pointers to one or more respective virtual function tables within the memory space of said second computer, and a corresponding number of data elements; and copying said data values from said received Make Replica message into said corresponding data elements of said replica-designate object, thereby creating the replica of said object.

\* \* \* \* \*

UNITED STATES PATENT AND TRADEMARK OFFICE
CERTIFICATE OF CORRECTION

PATENT NO. : 6,256,779 B1
APPLICATION NO. : 09/091741
DATED : July 3, 2001
INVENTOR(S) : Paul A. Martin It is certified that error appears in the above-identified patent and that said Letters Patent is hereby corrected as shown below:

In the Claims:

Col. 16, lines 15-18 should read as follows:

creating a data element location list of the locations of said plurality of data elements within said object;

Signed and Sealed this
Twenty-eighth Day of May, 2013

Teresa Stanek Rea
*Acting Director of the United States Patent and Trademark Office*